US011192585B2

(12) United States Patent
Matsuda et al.

(10) Patent No.: US 11,192,585 B2
(45) Date of Patent: Dec. 7, 2021

(54) LOWER BODY STRUCTURE OF VEHICLE

(71) Applicant: MAZDA MOTOR CORPORATION, Hiroshima (JP)

(72) Inventors: Yamato Matsuda, Hiroshima (JP); Nobuyuki Nakayama, Aki-gun (JP); Morihide Yamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 101 days.

(21) Appl. No.: 16/820,465

(22) Filed: Mar. 16, 2020

(65) Prior Publication Data
US 2020/0361534 A1 Nov. 19, 2020

(30) Foreign Application Priority Data

May 15, 2019 (JP) .............................. JP2019-092091
May 15, 2019 (JP) .............................. JP2019-092093

(51) Int. Cl.
*B60J 7/00* (2006.01)
*B62D 21/03* (2006.01)
*B62D 25/14* (2006.01)
*B62D 25/20* (2006.01)

(52) U.S. Cl.
CPC ........... *B62D 21/03* (2013.01); *B62D 25/145* (2013.01); *B62D 25/20* (2013.01)

(58) Field of Classification Search
CPC ......... B60R 7/04; B60R 11/0241; B60R 1/12; B60R 11/02; B60R 11/0247; A47B 21/00; A47B 21/06; A47B 2200/0013; A47B 2200/0046

See application file for complete search history.

(56) References Cited

U.S. PATENT DOCUMENTS

| 5,040,434 A | * | 8/1991 | Behrens ................. F16H 59/10 477/99 |
| 5,079,966 A | * | 1/1992 | Ishizuki ................. B60K 20/04 74/473.23 |
| 5,085,481 A | * | 2/1992 | Fluharty .................. B60R 7/04 296/37.14 |
| 5,560,253 A | * | 10/1996 | Ishikawa ............... B60K 20/04 403/330 |

(Continued)

FOREIGN PATENT DOCUMENTS

| JP | H08-058419 A | 3/1996 |
| JP | 2006-306330 A | 11/2006 |

*Primary Examiner* — Kiran B Patel
(74) *Attorney, Agent, or Firm* — Studebaker & Brackett PC

(57) ABSTRACT

A lower body structure includes a floor panel forming a floor surface of a vehicle interior, a floor cross member extending in a vehicle width direction above the floor panel, a console support bracket supporting a console at the center of the floor panel and mounted to the floor cross member, and a shift lever support bracket having an upper part supporting the shift lever and a lower part fixed to the console support bracket in front and rear portions. A mount point at which the shift lever is mounted to the shift lever support bracket is offset forward with respect to front and rear side fixing parts in which the shift lever support bracket is fixed to the console support bracket in the front and rear portions, and the front side fixing part of the console support bracket has a rigidity higher than the rear side fixing part.

20 Claims, 15 Drawing Sheets

(56) References Cited

U.S. PATENT DOCUMENTS

| | | | | | |
|---|---|---|---|---|---|
| 5,887,485 | A | * | 3/1999 | VanOrder | B60K 20/04 74/473.15 |
| 5,896,778 | A | * | 4/1999 | Murakami | F16H 61/36 74/473.34 |
| 5,970,814 | A | * | 10/1999 | Smith | B60K 20/04 224/539 |
| 5,992,264 | A | * | 11/1999 | Brock, Sr. | B60K 20/04 74/501.6 |
| 6,000,296 | A | * | 12/1999 | Sundquist | B60K 20/04 180/233 |
| 6,038,937 | A | * | 3/2000 | Van Order | F16H 59/105 200/61.85 |
| 6,098,483 | A | * | 8/2000 | Syamoto | F16H 59/10 74/473.12 |
| 6,843,521 | B1 | * | 1/2005 | Oana | B62D 25/145 180/90 |
| 9,458,925 | B1 | * | 10/2016 | Ding | B60K 20/04 |
| 2006/0243083 | A1 | * | 11/2006 | Blondeel | B60K 20/04 74/473.12 |
| 2014/0123798 | A1 | * | 5/2014 | Miyamoto | F16H 59/0278 74/473.3 |
| 2016/0101692 | A1 | * | 4/2016 | Chen | B60N 3/101 296/24.34 |
| 2019/0366935 | A1 | * | 12/2019 | Kawai | B60R 7/04 |
| 2019/0366936 | A1 | * | 12/2019 | Kawai | B60R 7/04 |
| 2020/0361535 | A1 | * | 11/2020 | Matsuda | B62D 21/04 |
| 2020/0361541 | A1 | * | 11/2020 | Matsuda | B62D 27/023 |
| 2020/0361542 | A1 | * | 11/2020 | Matsuda | B62D 25/2036 |
| 2021/0041020 | A1 | * | 2/2021 | Jeong | B60K 20/08 |

* cited by examiner

LOWER BODY STRUCTURE OF VEHICLE

BACKGROUND

Technical Field

The present disclosure relates to a lower body structure of a vehicle in which a shift lever is disposed in a console.

Background Art

Generally, when a center console is provided in the middle in vehicle width direction on the upper surface of the floor panel and a shift lever is disposed in this center console, a significant operation load is applied to the shift lever. Accordingly, a shift lever device or a shift lever support bracket is normally mounted to the body therebelow in the front and rear parts of a shift operation unit.

In the structure in which a storage space is obtained below the shift lever, since the support position of the shift lever device or the shift lever support bracket is offset backward with respect to the position of the shift lever, the support rigidity of the shift lever may be reduced.

JP-A-2006-306330 discloses the structure in which a case body of a shift lever device that supports a shift lever is provided, flange-shaped fixing parts are formed in the front lower part and the rear lower part of the case body, and the front side and rear side fixing parts are mounted to the upper surface part of a floor tunnel at the front and rear positions.

In addition, JP-A-8-58419 discloses the support structure of a shift lever device in which a bracket of a shift device that supports a shift lever is provided and the shift device is mounted onto the floor panel surface in the front and rear parts via the bracket. However, when a storage space is obtained below the shift lever in the conventional structures disclosed in JP-A-2006-306330 and JP-A-8-58419, problems similar to those described above occur.

SUMMARY

Accordingly, the present disclosure provides a lower body structure of a vehicle capable of obtaining a storage space below a shift lever while suppressing reduction in the support rigidity of the shift lever.

A lower body structure of a vehicle according to the present disclosure includes a floor panel that forms a floor surface of a vehicle interior; a floor cross member provided so as to extend in a vehicle width direction above the floor panel; a console support bracket that supports a console provided at a center of the floor panel and is mounted to the floor cross member; and a shift lever support bracket having an upper part that supports a shift lever and a lower part that is fixed to the console support bracket in front and rear portions thereof. Also, a mount point at which the shift lever is mounted to the shift lever support bracket is offset forward with respect to front side and rear side fixing parts in which the shift lever support bracket is fixed to the console support bracket, and the front side fixing part of the console support bracket has a rigidity higher than the rear side fixing part.

In the structure described above, the shift lever is supported by the upper part of the shift lever support bracket, the lower part thereof is fixed to the console support bracket in the front and rear parts, and the rigidity of the front side fixing part of the console support bracket is high, so reduction in the support rigidity of the shift lever can be suppressed.

In addition, since the mount point at which the shift lever is mounted to the shift lever support bracket is offset forward with respect to the fixing part in which the shift lever support bracket is fixed to the console support bracket, a storage space can be obtained below the shift lever. That is, a storage space can be obtained below the shift lever while suppressing reduction in the support rigidity of the shift lever.

According to an aspect of the present disclosure, the console support bracket is formed to have a portal cross-section including an upper wall and both side walls in vehicle front view, the upper wall and both the side walls in a region of the front side fixing part are fastened to a lower body, and only the upper wall in a region of the rear side fixing part is fastened to a lower body.

In the structure described above, the support rigidity of the shift lever is obtained by fastening the upper wall and both the side walls to the lower body in the region of the front side fixing part that receives an operation load of the shift lever, and the console support bracket can be simplified, the number of components required for fastening can be reduced, and the number of man-hours can be reduced by fastening only the upper wall to the lower body in the region of the rear side fixing part.

According to an aspect of the present disclosure, the region of the front side fixing part of the console support bracket is fixed to the floor cross member, and the region of the rear side fixing part of the console support bracket is fixed to an erection bracket that erects upward from the floor panel.

In the structure described above, since the regions of the front side and rear side fixing parts of the console support bracket are fixed to the floor cross member and the erection bracket, the left and right side walls of the console support bracket do not need to extend downward to the floor panel and the height of both the side walls of the console support bracket can be reduced, thereby enabling weight reduction.

According to an aspect of the present disclosure, the lower body structure of a vehicle further includes an upward enlarged cross-sectional part having a cross-section enlarged upward at a center of the floor cross member, in which the console support bracket is fastened to the upward enlarged cross-sectional part.

In the structure described above, by fastening the console support bracket to the upward enlarged cross-sectional part while improving side collision performance using the upward enlarged cross-sectional part, the lower end of the console support bracket does not need to extend downward to the floor panel, thereby enabling reduction in the weight of the console support bracket and improvement of the support rigidity thereof.

According to an aspect of the present disclosure, the lower body structure of a vehicle further includes a reinforcing support bracket provided at the center of the upward enlarged cross-sectional part of the floor cross member so as to erect upward, in which both the side walls of the console support bracket are fastened to the upward enlarged cross-sectional part, and the upper wall is fastened to the reinforcing support bracket. In the structure described above, the rigidity of the front side fixing part of the console support bracket to which the shift lever support bracket is fixed can be improved by the reinforcing support bracket.

According to an aspect of the present disclosure, a tunnel part is formed in a portion of the floor panel, the portion being located in front of the shift lever support bracket, a front part of the console support bracket is connected to the tunnel part, and a reinforcing member that reinforces a portion of the console support bracket is provided, the portion being located in front of the front side fixing part.

The structure described above has the following effect. That is, since a significant load by a shift lever operation is applied to the front side fixing part of the console support bracket and the portion in front of it and the reinforcing member reinforces the portion functioning as the bridge between the floor cross member and the tunnel part, the rigidity of the portion between the floor cross member and the tunnel part can be improved.

According to an aspect of the present disclosure, the reinforcing member is formed to have a portal cross-section for reinforcing the upper wall and both the side walls of the console support bracket. In the structure described above, the yield strength of the console support bracket against a load from above the reinforcing member can be improved.

According to an aspect of the present disclosure, both the side walls and the upper wall of the console support bracket are connected to the tunnel part via a reinforcing bracket welded to the tunnel part, the reinforcing bracket has a second reinforcing member, and the console support bracket, the reinforcing bracket, the reinforcing member, and the second reinforcing member are superposed on each other via the upper walls and both the side walls and fastened by a fastener.

In the structure described above, the rigidity of the front joint part (that is, the joint part between the front part of the console support bracket and the rear part of the reinforcing bracket) that is likely to become a weak point due to application of a significant load by a shift lever operation can be improved by the superposed fastening structure (so-called joint fastening structure) of the four components described above.

The present disclosure has the effect of obtaining a storage space below the shift lever while suppressing reduction in support rigidity.

According to another aspect of the present disclosure, the erection bracket further extends backward from a mount part of the shift lever support bracket, and an upper surface part of a console support bracket is fixed to the erection bracket behind the mount part of the shift lever support bracket. In the structure described above, the rear portion of the shift lever support bracket can be supported by the upper surface of the console support bracket and the erection bracket further extends backward from the mount part of the shift lever support bracket, so the fixing range in which the erection bracket is fixed to the floor panel is enlarged, thereby enabling further suppression of vibrations of the floor panel.

According to another aspect of the present disclosure, left and right portions of the shift lever support bracket are mounted to the erection bracket, and the erection bracket is formed to have an M-shaped cross-section in vehicle front view and both sides and a middle part of the erection bracket are joined and fixed to the floor panel. In the structure described above, by forming the erection bracket to have an M-shaped cross-section, it is possible to improve the rigidity of both left and right sides of the erection bracket and the middle part of the erection bracket between the support parts that support the shift lever support bracket.

According to another aspect of the present disclosure, leg parts are formed on both the sides of the erection bracket, a plurality of beads raised outward is formed in each of the leg parts, the beads being arranged in a vehicle longitudinal direction at intervals, flange parts extending outward from lower ends of the leg parts are formed at the lower ends, and the flange parts are joined and fixed to the floor panel via portions between the beads. In the structure described above, the rigidity in the vertical direction of the erection bracket is improved by the plurality of beads formed on the leg parts, and weight reduction of the erection bracket can be achieved by reduction in the area of the flange parts.

According to a further aspect of the present disclosure, the erection bracket has a dimension in the vehicle width direction smaller than the console support bracket, a second floor cross member having a height smaller than the console support bracket is provided behind the erection bracket, and the console support bracket is formed to have a portal cross-section in vehicle front view and a side wall part of the console support bracket is mounted to the second floor cross member. In the structure described above, the dimension in the vehicle width direction of the erection bracket is smaller than the dimension in the vehicle width direction of the console support bracket, thereby enabling weight reduction of the erection bracket by reducing the dimension in the vehicle width direction of the erection bracket.

In addition, since the side wall parts of the console support bracket are mounted to the second floor cross member and the side wall parts of the console support bracket do not need to extend downward to the floor panel, the console support bracket can be supported by the vehicle body while achieving weight reduction of the side wall parts of the console support bracket.

DETAILED DESCRIPTION

A lower body structure of a vehicle according to the present disclosure obtains a storage space below a shift lever while suppressing reduction in the support rigidity of the shift lever. The lower body structure of a vehicle includes a floor panel that forms a floor surface of a vehicle interior, a floor cross member provided so as to extend in a vehicle width direction above the floor panel, a console support bracket that supports a console provided at a center of the floor panel and is mounted to the floor cross member, and a shift lever support bracket having an upper part that supports a shift lever and a lower part that is fixed to the console support bracket in front and rear portions thereof. A mount point at which the shift lever is mounted to the shift lever support bracket is offset forward with respect to the front side and rear side fixing parts in which the shift lever support bracket is fixed to the console support bracket, and the front side fixing part of the console support bracket has a rigidity higher than the rear side fixing part.

Figure 1:
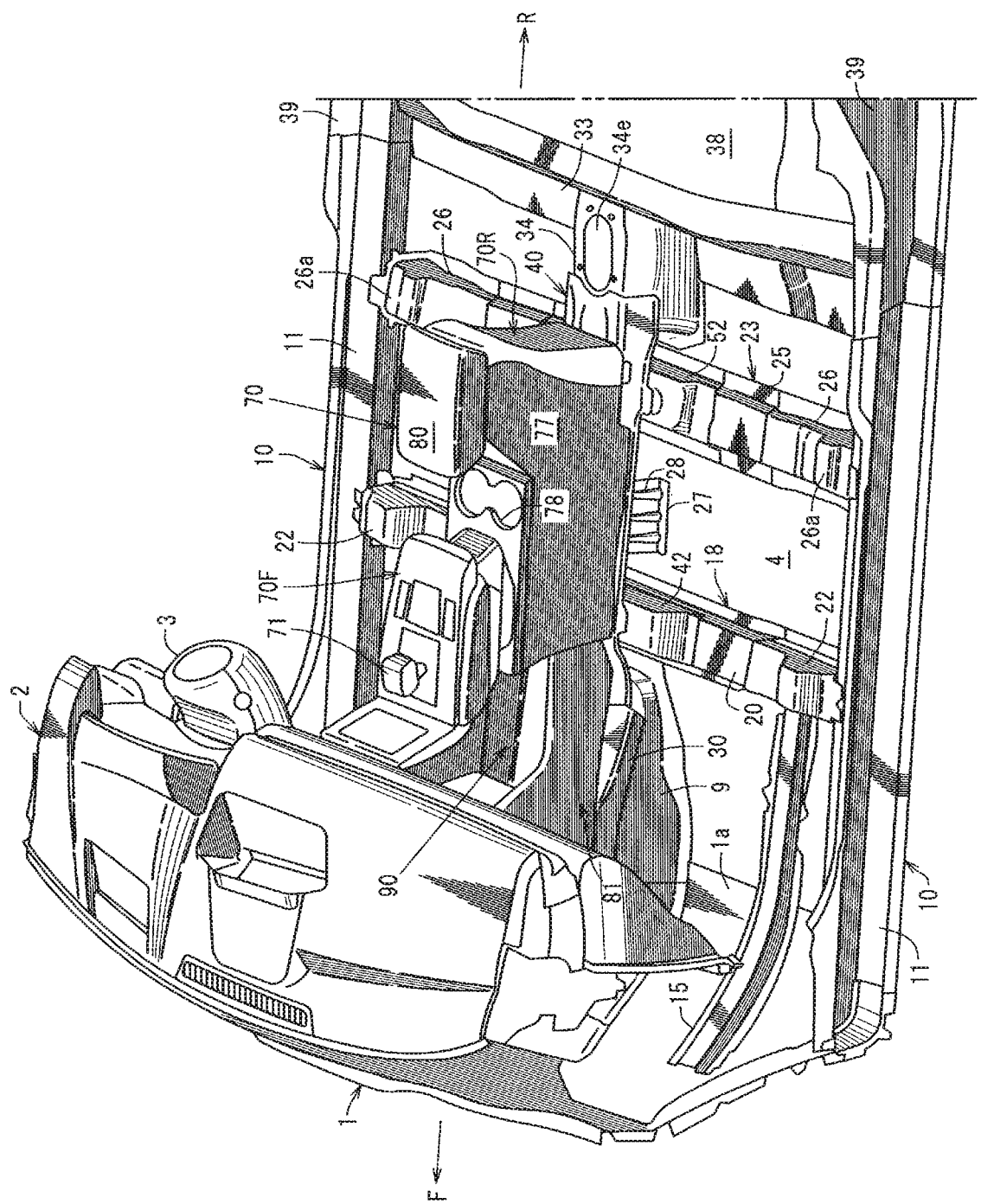
FIG. 1 is a perspective view illustrating a lower body structure of a vehicle according to the present disclosure.

An embodiment of the present disclosure will be described below with reference to the drawings. The drawings illustrate a lower body structure of a vehicle. FIG. 1 is a perspective view illustrating the lower body structure, FIG. 2 is a plan view illustrating the lower body structure from which an instrument panel and a console have been removed, and FIG. 3 is a vertical cross-sectional view illustrating the lower body structure of a vehicle taken along a vertical plane passing through substantially the middle in the vehicle width direction.

It should be noted here that the following example illustrates, as the lower body structure of a vehicle, a lower body structure of an electric vehicle that does not include an engine for vehicle travel, an exhaust air pipe, and a center tunnel part extending in the vehicle longitudinal direction. In addition, the lower body structure in this example is substantially bilaterally symmetrical.

Figure 2:
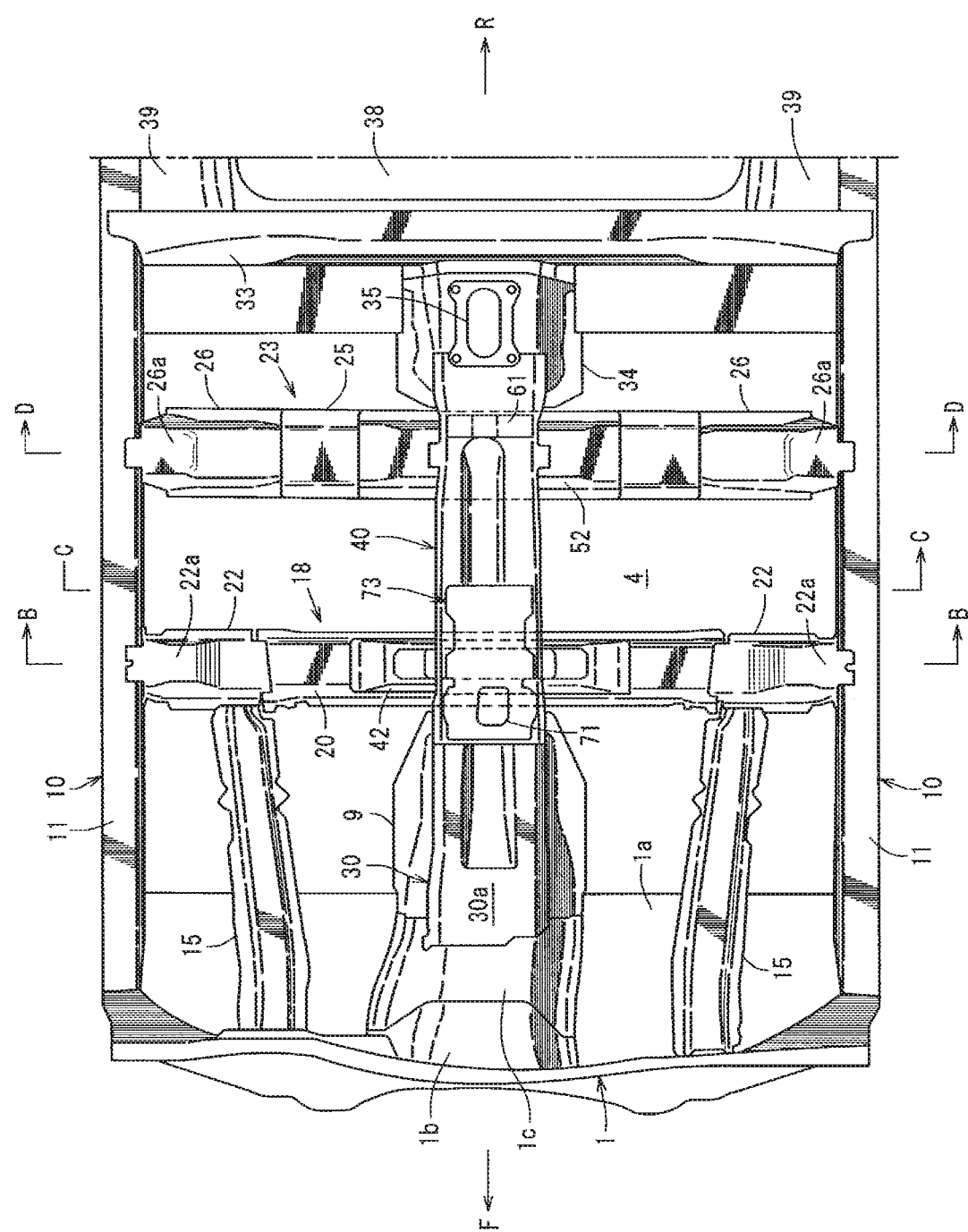
FIG. 2 is a plan view illustrating the lower body structure from which an instrument panel and a console have been removed.

In FIGS. 1 and 2, a dash panel 1 (specifically, a dash lower panel) that partitions, in the vehicle longitudinal direction, a motor room in which a vehicle-driving motor (not illustrated) is disposed from the vehicle interior is provided and an instrument panel 2 is disposed in front of a front seat in the portion of the dash panel 1 close to the vehicle interior. In the portion of the instrument panel 2 close to a driver's seat (the right side in the vehicle width direction since this example illustrates a right-hand drive vehicle), a steering column cover 3 having a steering column and a steering shaft therein is provided.

Figure 3:
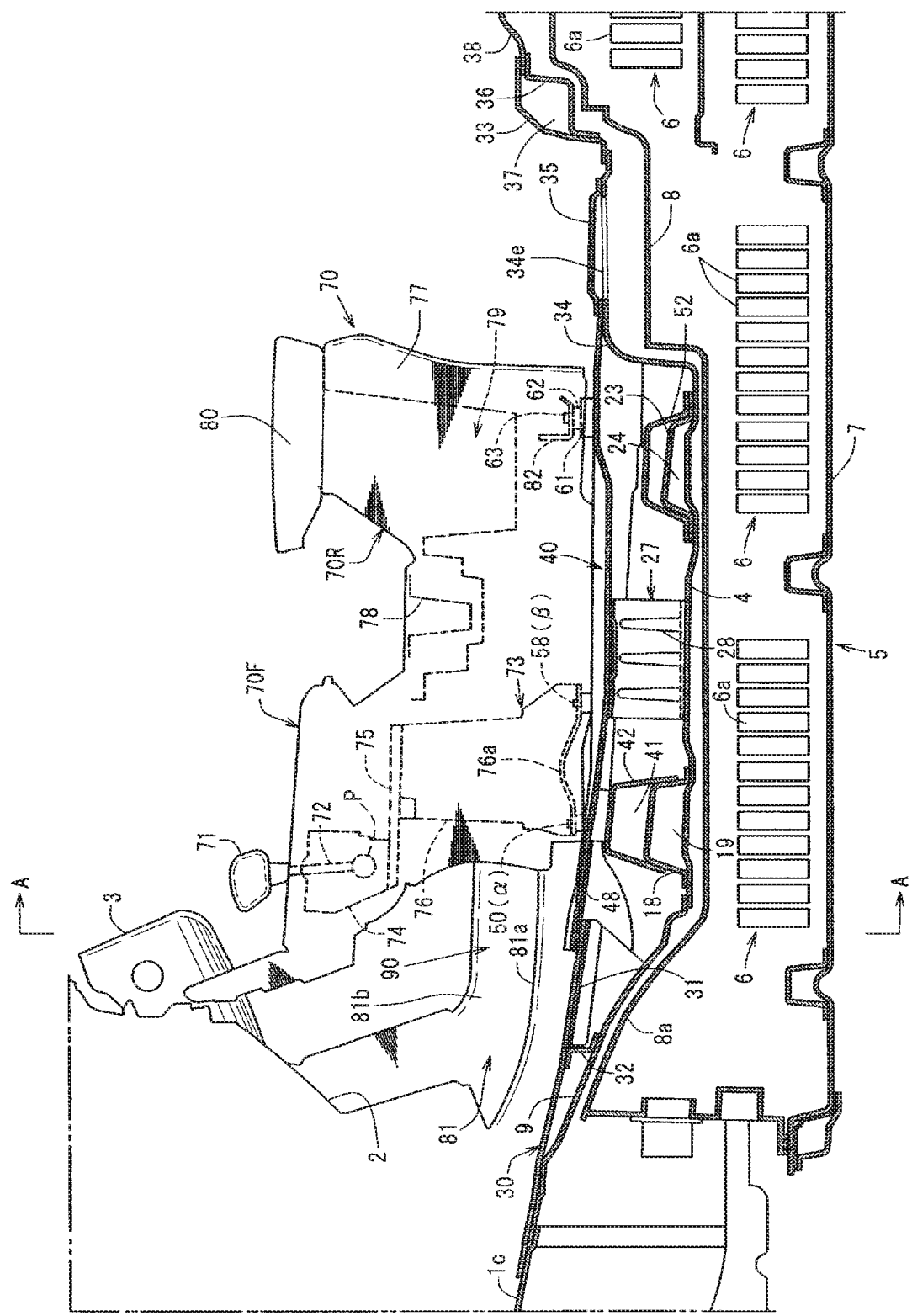
FIG. 3 is a vertical cross-sectional view illustrating the lower body structure of a vehicle taken along a vertical plane passing through substantially the middle in the vehicle width direction.

As illustrated in FIGS. 2 and 3, a substantially flat front floor panel 4 having no center tunnel is continuously provided in a lower rear end part 1a of the dash panel 1 described above. This front floor panel 4 forms the floor surface of the vehicle interior.

As illustrated in FIG. 3, a battery device (so-called battery pack) 5 as a driving source for vehicle travel via the motor is disposed below the front floor panel 4 described above. This battery device 5 includes a plurality of battery units 6 each of which has a plurality of battery bodies 6a. The plurality of battery units 6 is arranged in one row below the front floor panel 4 and the plurality of battery units 6 is arranged vertically in two rows below a rear floor pan 38 described later.

In addition, the battery device 5 described above includes a battery tray 7 that supports the plurality of battery units 6 from below and a battery case 8, mounted onto the upper surface of an outside flange of the battery tray 7, that has the battery units 6 described above therein, and a raised part 8a raised upward toward a tunnel part 9 is formed integrally with the front part of the battery case 8 in the position corresponding to a partial tunnel part 9 provided in the middle in the vehicle width direction in the front part of the front floor panel 4. This raised part 8a is provided to obtain a space in which cables (not illustrated) can be disposed in the battery case 8.

Figure 5:
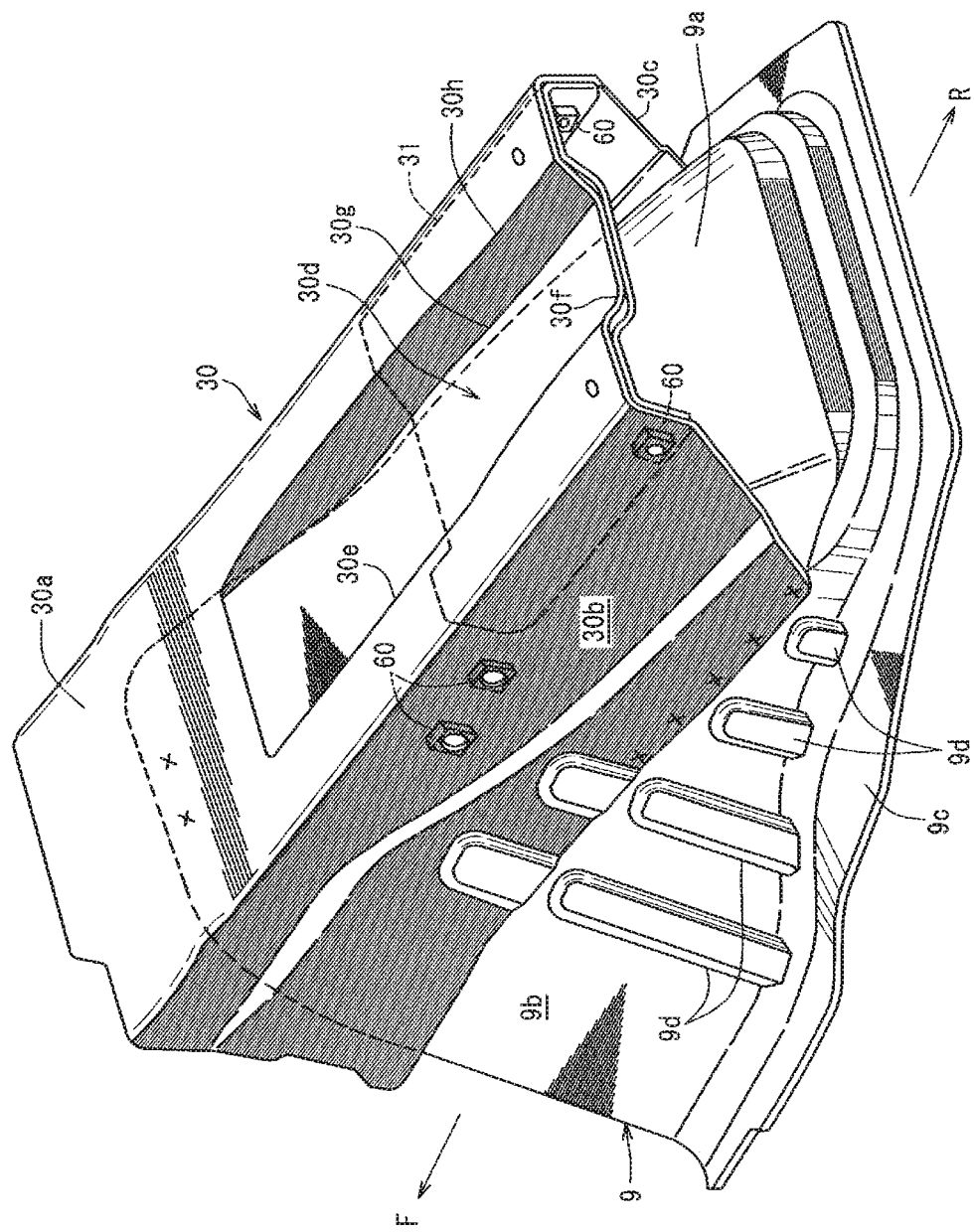
FIG. 5 is a perspective view illustrating a tunnel part and a reinforcing bracket.

As illustrated in the perspective view in FIG. 5, the tunnel part 9 described above is formed by integrating a top surface part 9a inclined high in front and low in rear, left and right side surface parts 9b that extend downward from the both side ends of the top surface part 9a and are substantially triangular in vehicle side view, and a flange part 9c that extends to the rear and both the left and right sides from the inclining lower end part of the top surface part 9a and the lower end parts of the left and right side surface parts 9b and are joined and fixed to the front floor panel 4, and a plurality of bead parts 9d is formed integrally with the side surface parts 9b to improve the rigidity of the tunnel part 9.

As illustrated in FIGS. 2 and 3, tunnel shape parts 1b and 1c are formed integrally or substantially integrally below the middle in the vehicle width direction of the dash panel 1 so as to be continuous with the tunnel portion 9 described above.

As illustrated in FIG. 2, side sills 10 that have a closed cross-sectional structure and extend in the vehicle longitudinal direction are joined and fixed to both sides in the vehicle width direction of the front floor panel 4.

Figure 4:
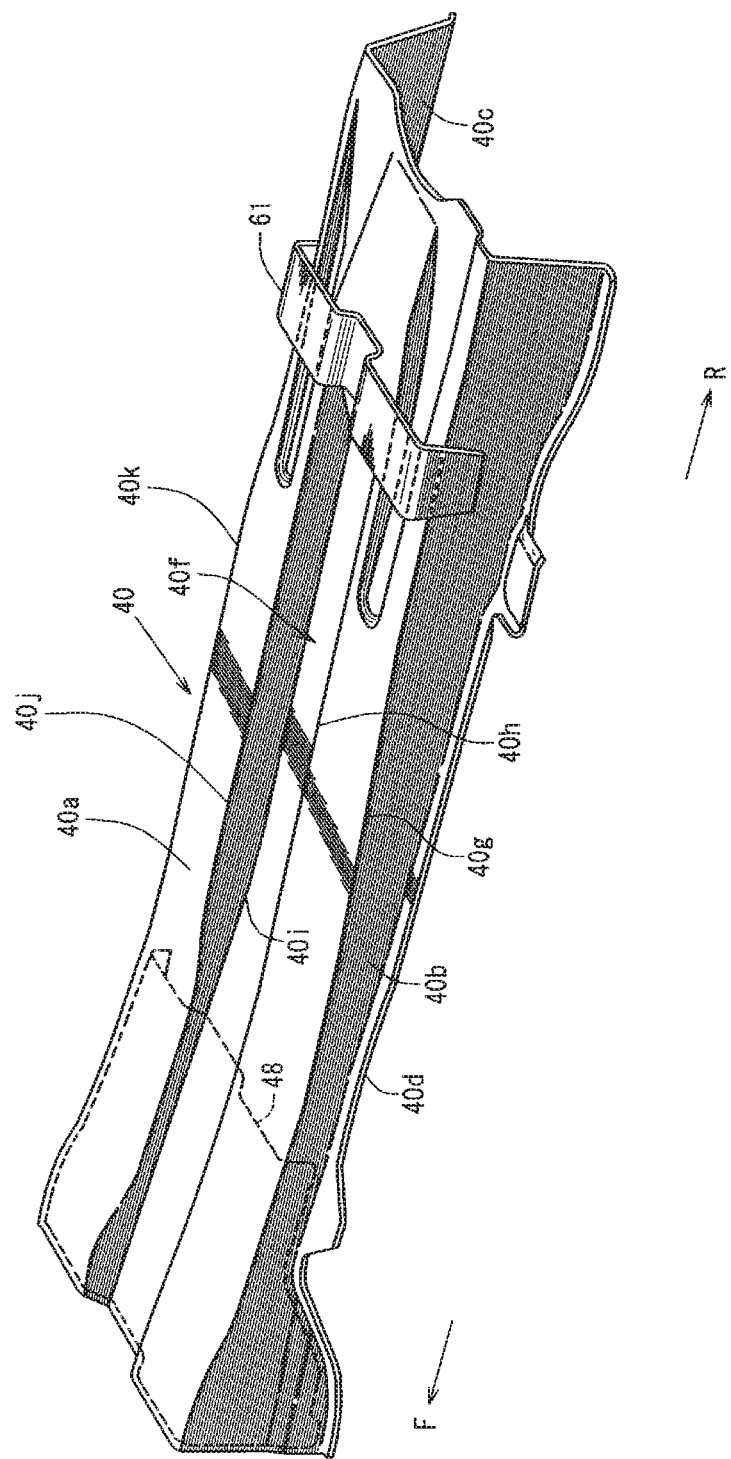
FIG. 4 is a perspective view illustrating a console support bracket.
Figure 6:
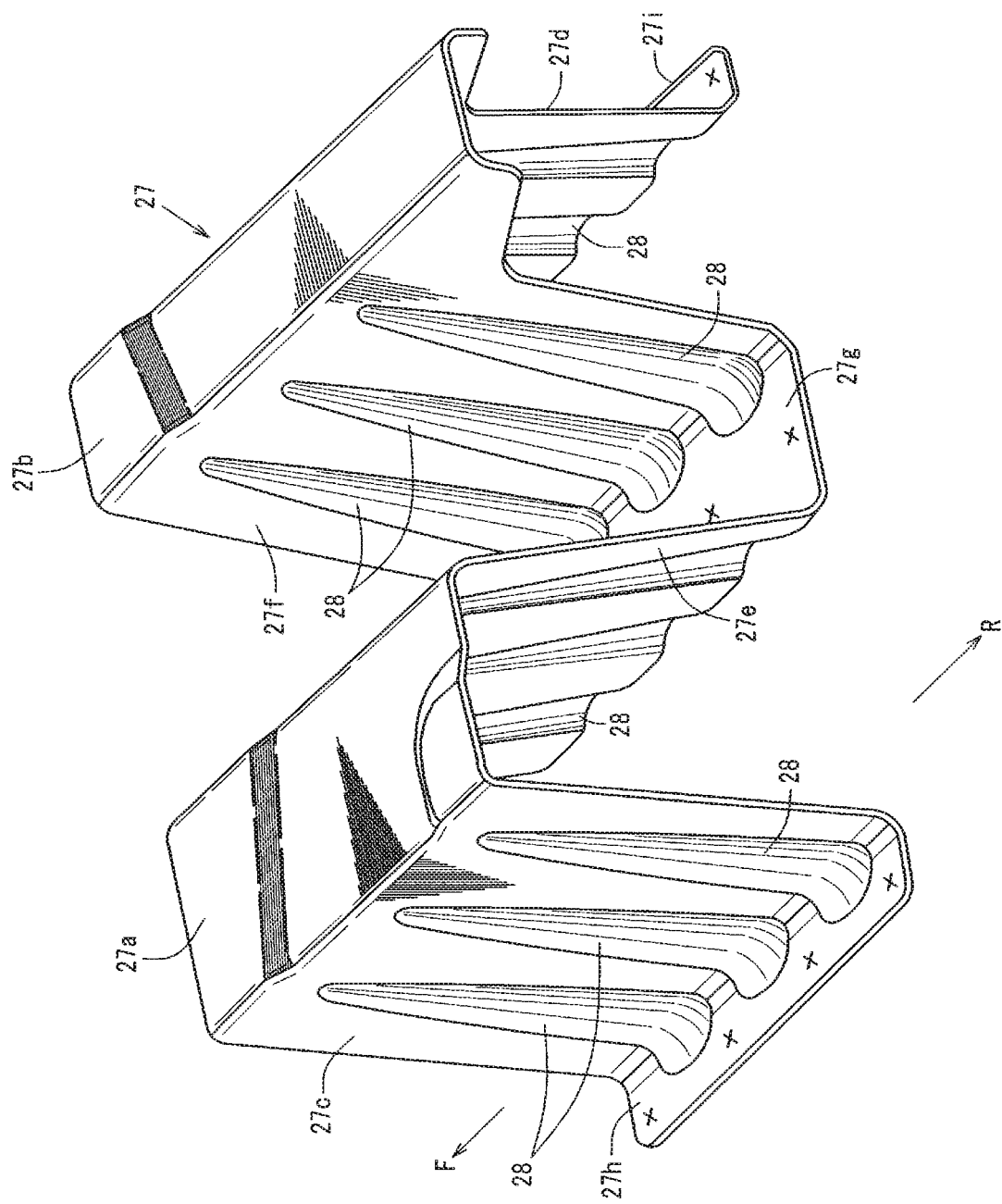
FIG. 6 is a perspective view illustrating an erection bracket.
Figure 7:
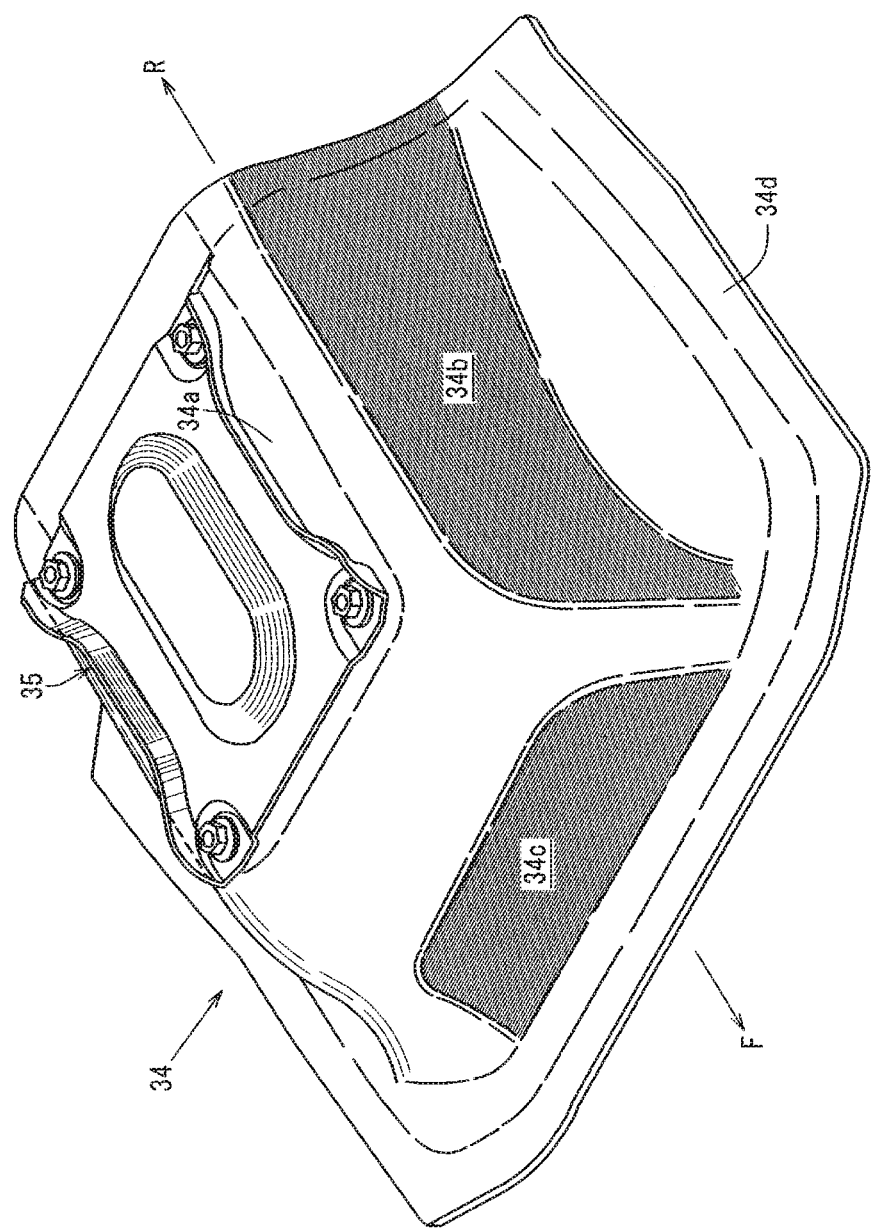
FIG. 7 is a perspective view illustrating a kick-up part reinforcing member.
Figure 8:
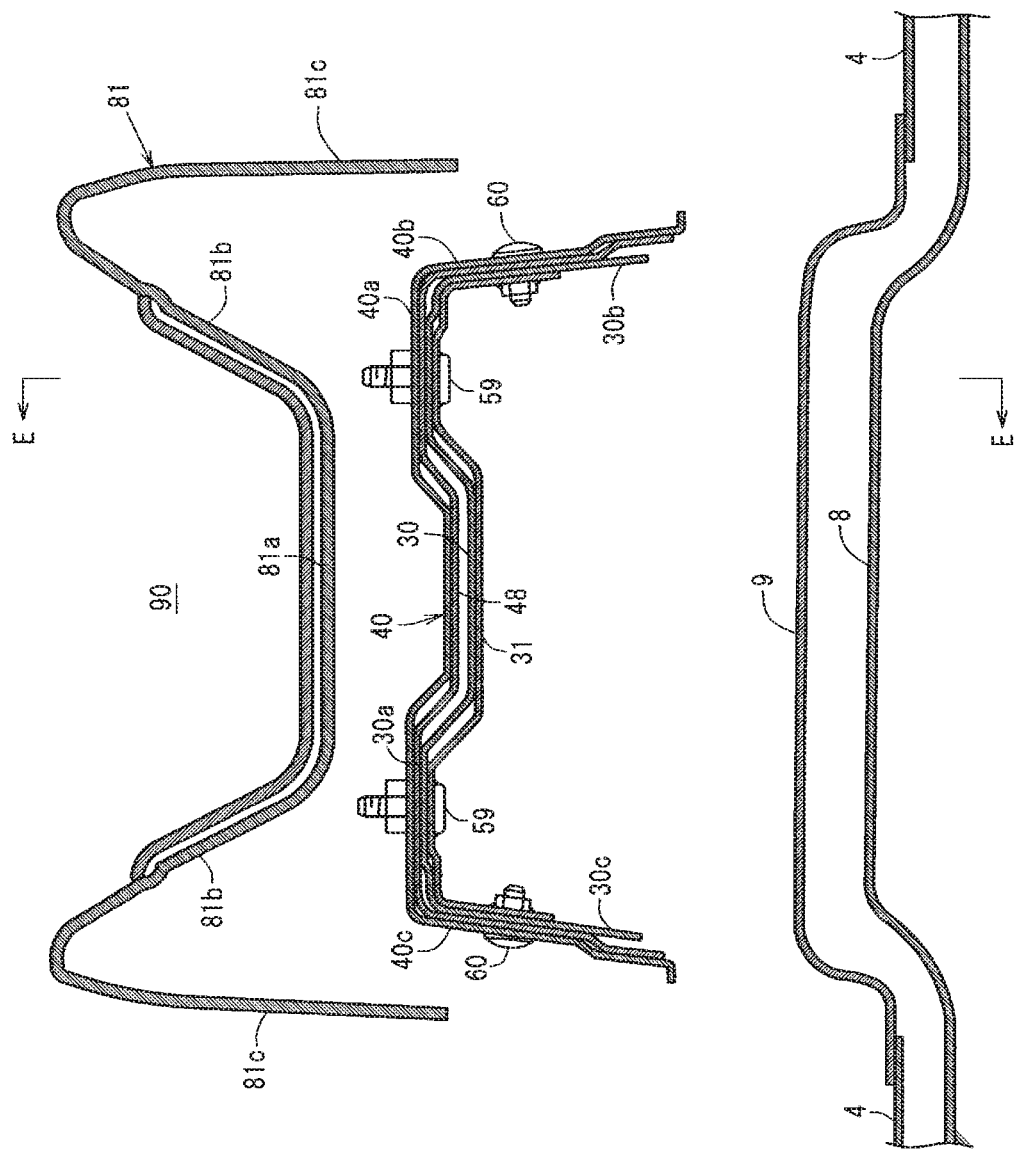
FIG. 8 is an enlarged cross-sectional view illustrating the main part taken along line A-A in FIG. 3.
Figure 9:
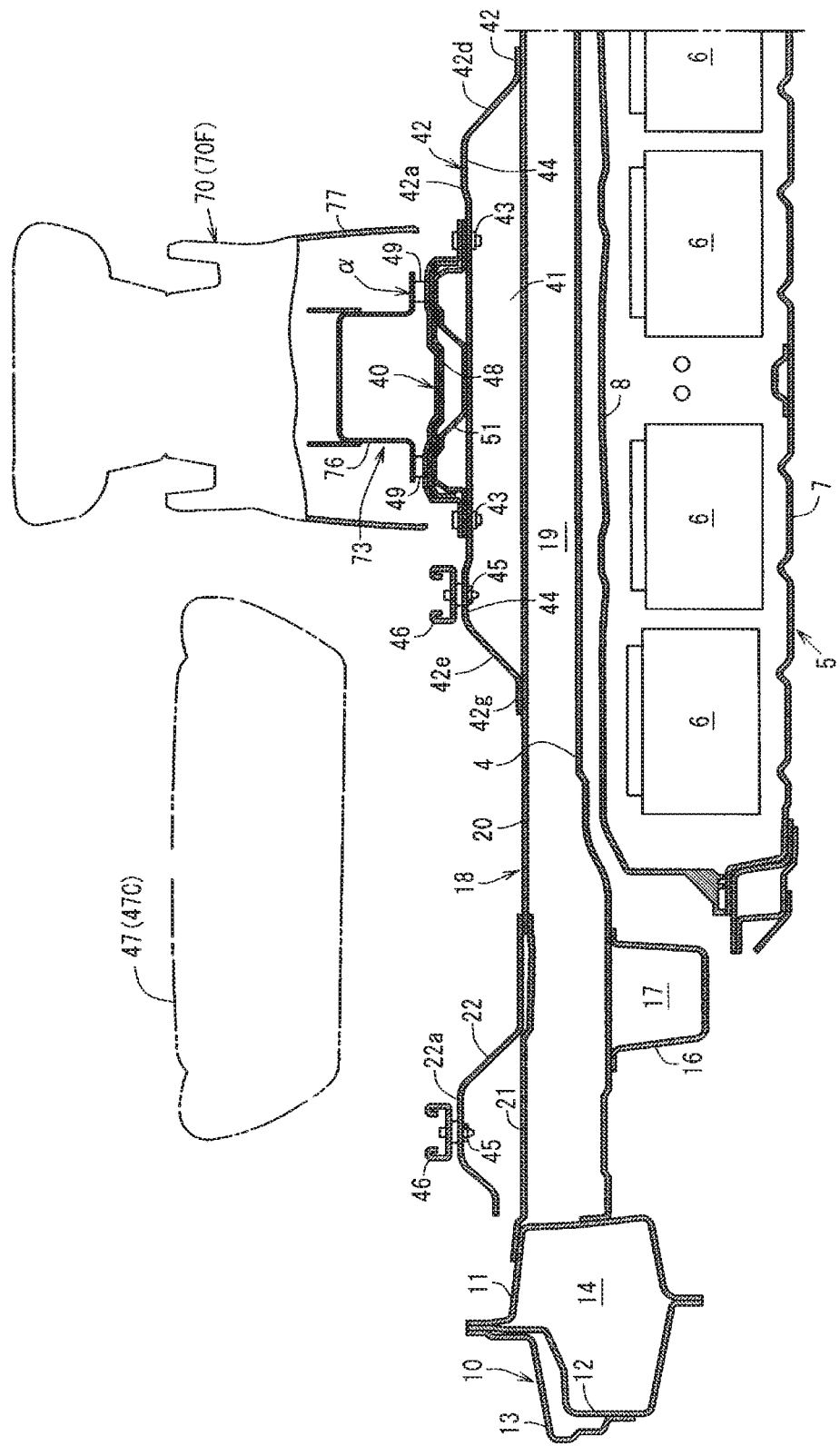
FIG. 9 is a cross-sectional view illustrating the main part taken along line B-B in FIG. 2.
Figure 10:
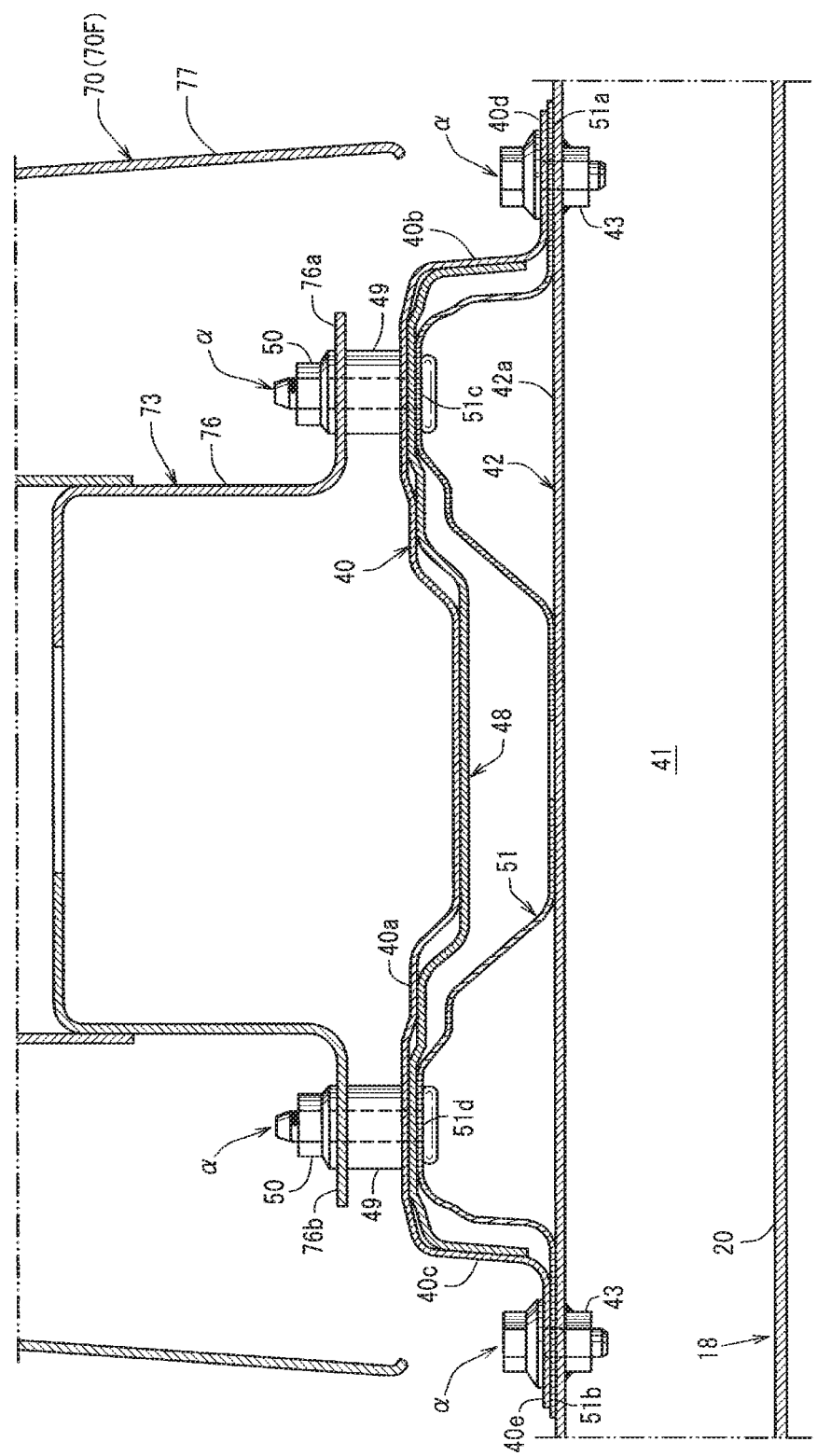
FIG. 10 an enlarged cross-sectional view illustrating the main part in FIG. 9.
Figure 11:
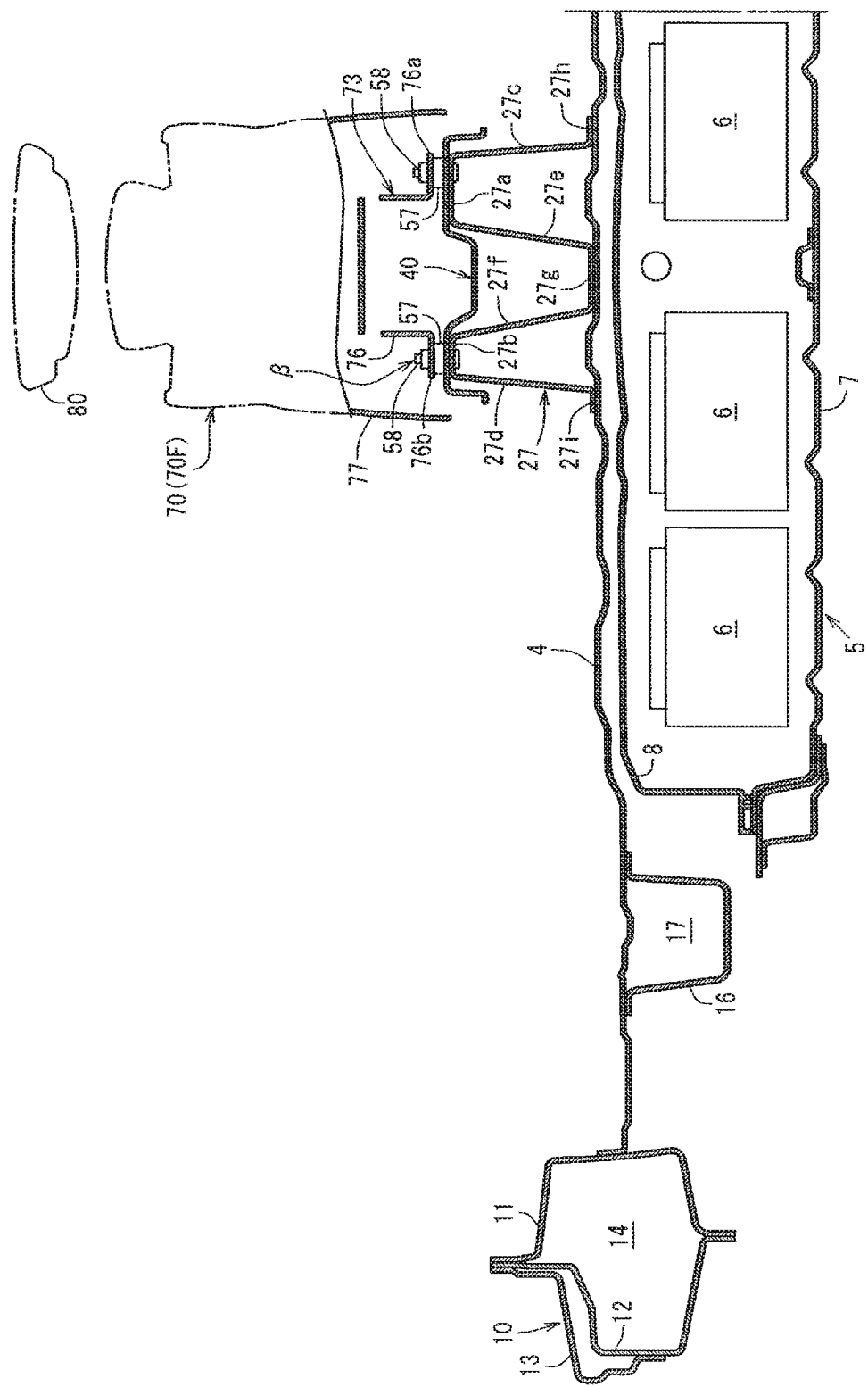
FIG. 11 is a cross-sectional view illustrating the main part taken along line C-C in FIG. 2.
Figure 12:
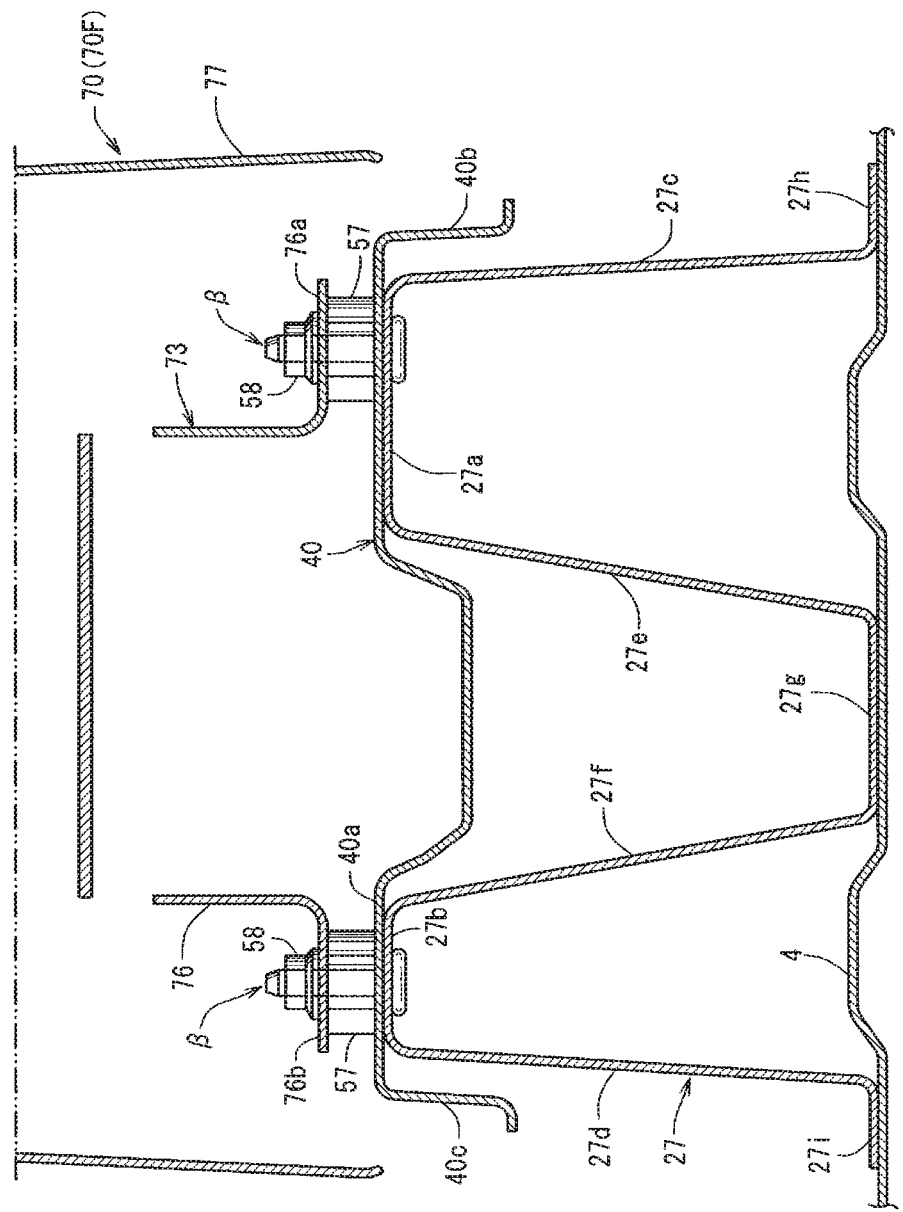
FIG. 12 is an enlarged cross-sectional view illustrating the main part in FIG. 11.
Figure 13:
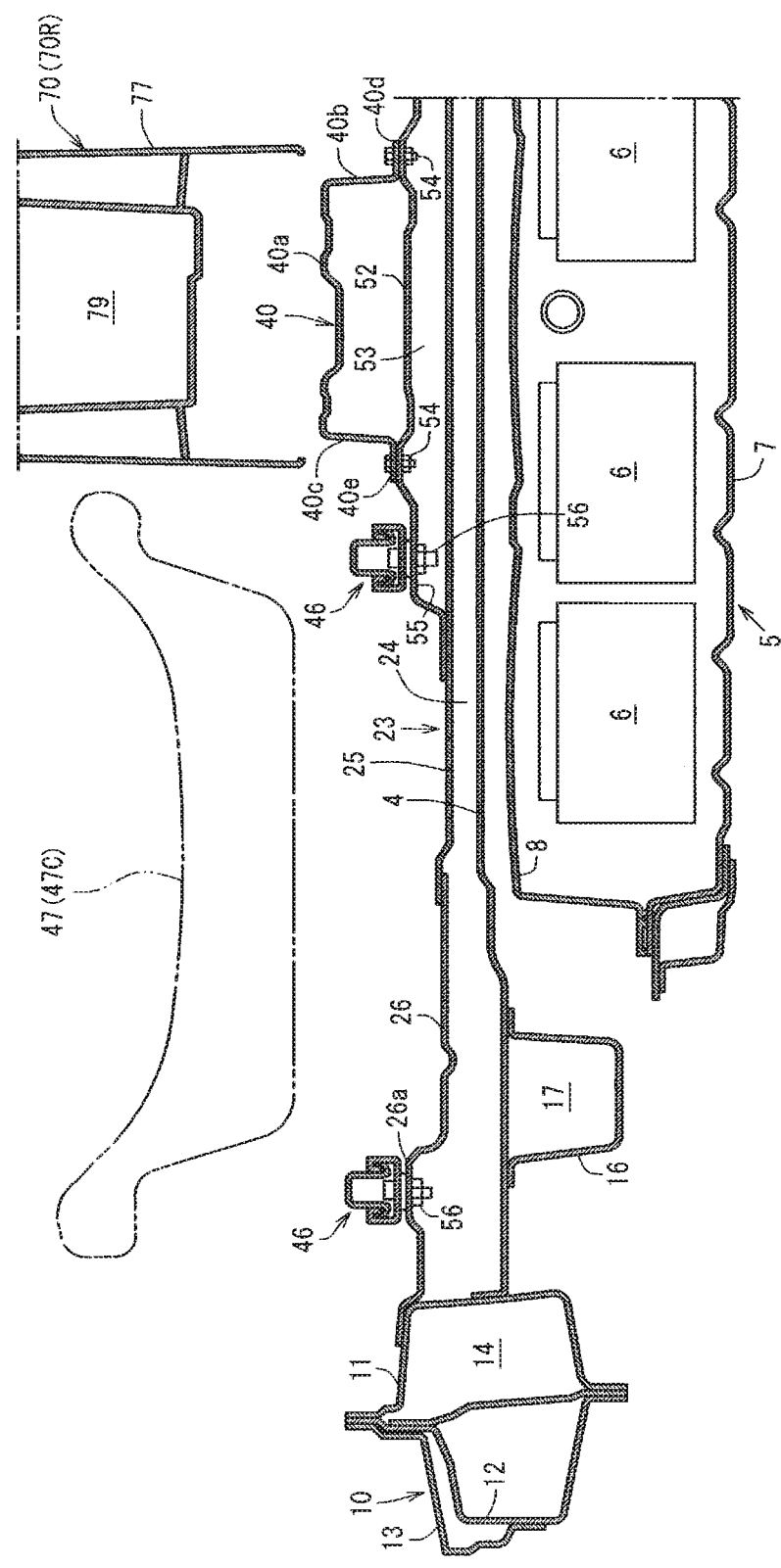
FIG. 13 is a cross-sectional view illustrating the main part taken along line D-D in FIG. 2.
Figure 14:
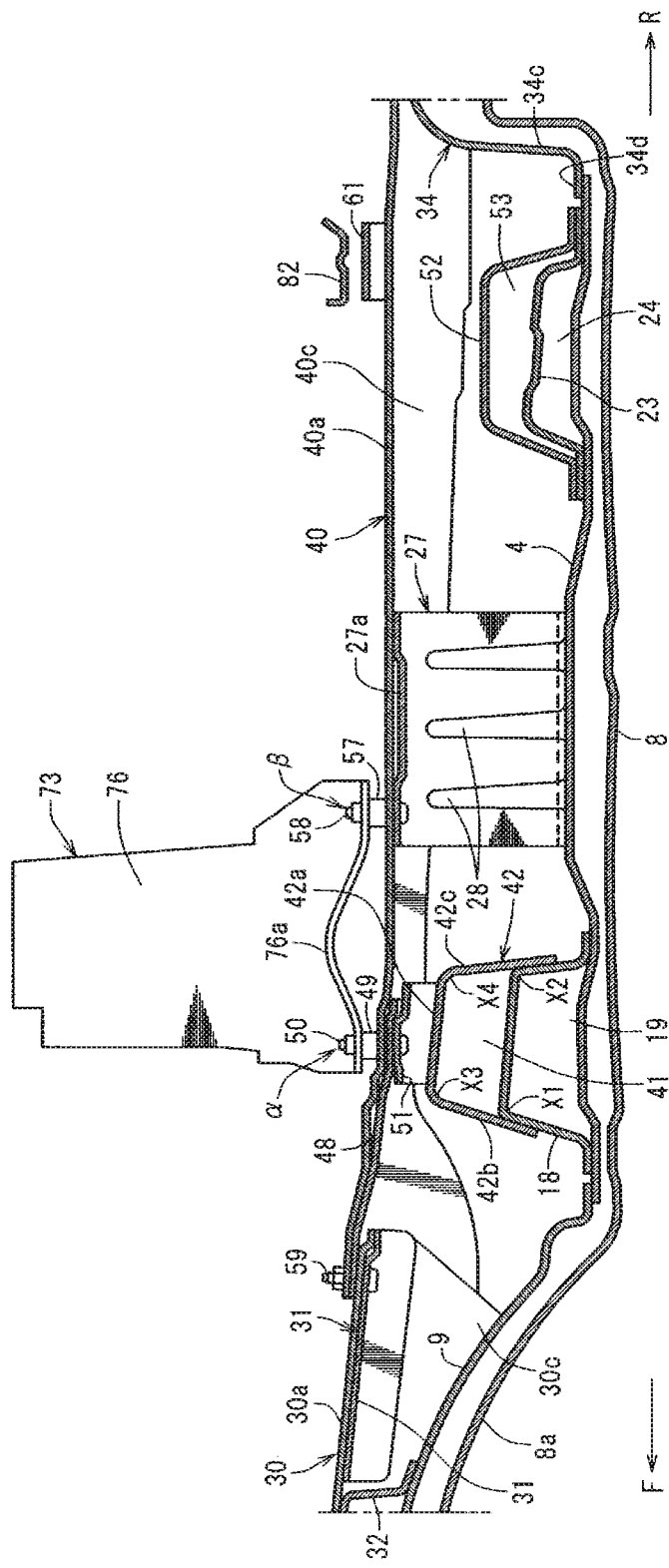
FIG. 14 is a cross-sectional view seen along arrows E-E in FIGS. 8.
Figure 15:
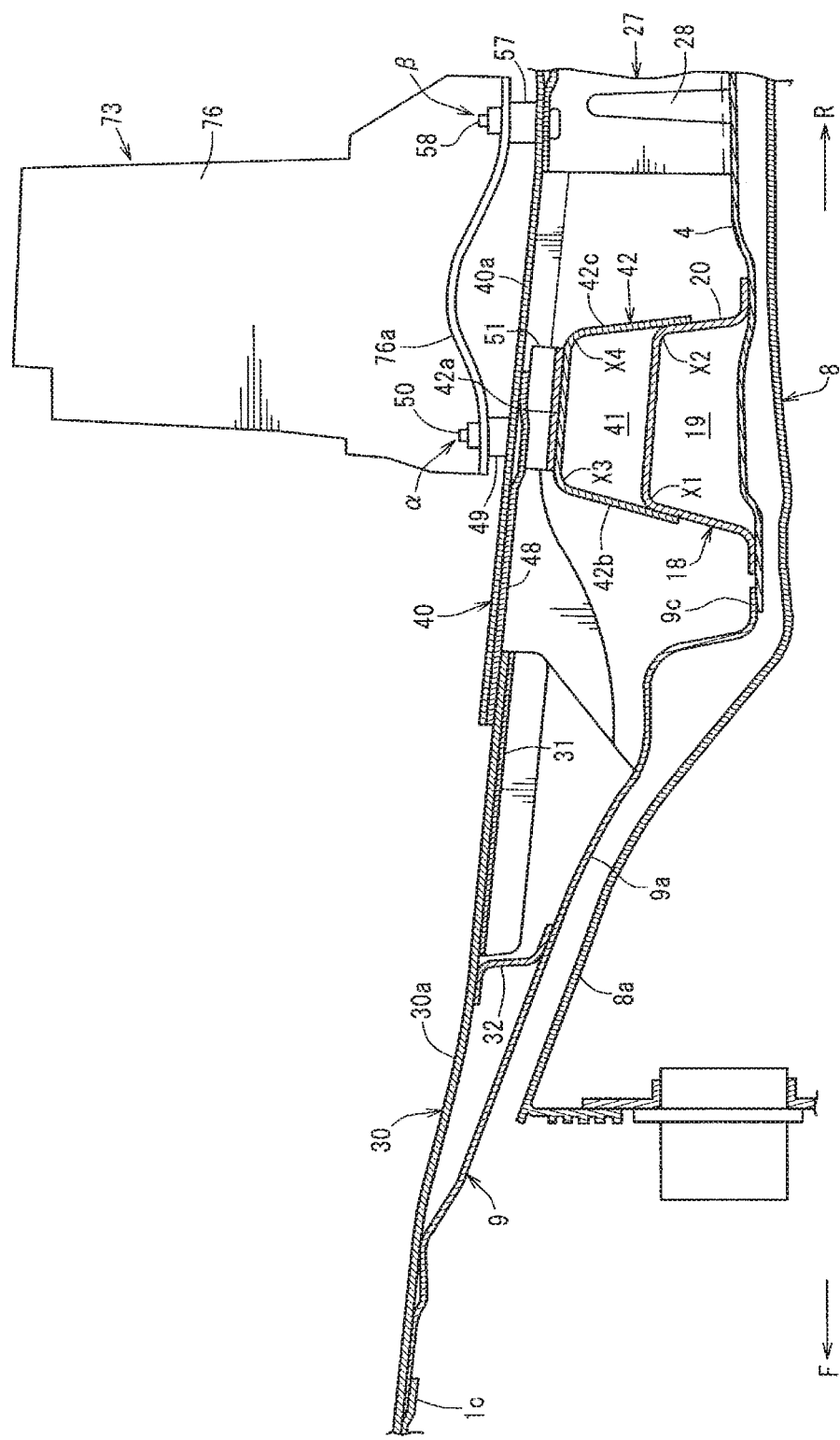
FIG. 15 is an enlarged cross-sectional view illustrating the main part in FIG. 3.

FIG. 4 is a perspective view illustrating the console support bracket, FIG. 5 is a perspective view illustrating the tunnel part and the reinforcing bracket, FIG. 6 is a perspective view illustrating the erection bracket, FIG. 7 is a perspective view illustrating the kick-up part reinforcing member, FIG. 8 is an enlarged cross-sectional view illustrating the main part taken along line A-A in FIG. 3, FIG. 9 is a cross-sectional view illustrating the main part taken along line B-B in FIG. 2, FIG. 10 is an enlarged cross-sectional view illustrating the main part in FIG. 9, FIG. 11 is a cross-sectional view illustrating the main part taken along line C-C in FIG. 2, FIG. 12 is an enlarged cross-sectional view illustrating the main part in FIG. 11, FIG. 13 is a cross-sectional view illustrating the main part taken along line D-D in FIG. 2, FIG. 14 is a cross-sectional view seen along arrows E-E in FIG. 8, and FIG. 15 is an enlarged cross-sectional view illustrating the main part in FIG. 3.

As illustrated in FIGS. 9, 11, and 13, the side sill 10 described above is a body strength member formed by joining and fixing a side sill inner 11, a side sill reinforcement 12, and a side sill outer 13 and has a side sill closed cross-section 14 extending in the vehicle longitudinal direction.

As illustrated in FIGS. 1 and 2, the floor frame uppers 15 (that is, the upper floor frames) are joined and fixed along the vehicle longitudinal direction between the upper surface of the lower part of the dash panel 1 and the upper surface of the front floor panel 4 in the middle in the vehicle width direction between the side sills 10 and the tunnel portion 9 described above. This floor frame upper 15 is a frame (body component) having a hat-shaped cross-section and extending in the vehicle longitudinal direction, and a closed cross-sectional part extending in the vehicle longitudinal direction is formed between the floor frame upper 15, and the dash panel 1 and the front floor panel 4.

As illustrated in FIGS. 9, 11, and 13, in the middle part in the vehicle width direction between the side sills 10 described above and the battery device 5, floor frame lowers 16 (that is, lower floor frames) are joined and fixed onto the lower surface of the front floor panel 4. The floor frame lower 16 is a frame (body component) having a reverse hat-shaped cross-section and extending in the vehicle longitudinal direction, and a closed cross-section part 17 extending in the vehicle longitudinal direction is formed between the floor frame lower 16 and the front floor panel 4.

As illustrated in FIG. 2, a front cross member (so-called No. 2 cross member) 18 as the floor cross member that extends linearly in the vehicle width direction between the pair of left and right side sills 10 is provided on the upper surface of the front floor panel 4 in proximity to the rear end of the tunnel part 9 described above.

As illustrated in FIG. 9, the front cross member 18 is jointed and fixed to the front floor panel 4 so as to extend linearly above the front floor panel 4 in the vehicle width direction between the left and right side sills 10 at the same height as the upper surface part of the side sill inners 11 below the front part of the front seat.

As illustrated in FIG. 3, the front cross member 18 has a reverse hat-shaped cross-section and a closed cross-section part 19 extending linearly in the vehicle width direction is formed between the front cross member 18 and the front floor panel 4. In addition, as illustrated in FIG. 9, the upper surface of the front cross member 18 as the floor cross member is formed substantially linearly in the vehicle width direction.

In addition, as illustrated in FIG. 9, the left and right floor frame lowers 16 (however, only the right floor frame lower 16 is illustrated in FIG. 9) extending in the vehicle longitudinal direction are provided below the front floor panel 4 as described above, and the front cross member 18 described above includes an middle member 20 with a hat-shaped cross-section located between the left and right floor frame lowers 16 (that is, in the middle portion in the vehicle width direction) and side members 21 with a hat-shaped cross-section located on the outer sides (that is, on both sides in the vehicle width direction) in the vehicle width direction of the floor frame lowers 16. In addition, the middle member 20 described above is made from an ultra-high-tensile steel plate with a thickness of 1.8 mm and the side members 21 described above are made from a high-tensile steel plate (so-called high-tensile material) with a thickness of 1.0 mm.

That is, the floor cross member portion (see the middle member 20) between the left and right floor frame lowers 16 of the front cross member 18 has a rigidity higher than in the portions (see the side members 21) located on the outer sides in the vehicle width direction of the floor frame lowers 16 in the vehicle width direction (see the side member 21) and the middle member 20 is formed by one member (single component). Accordingly, the side members 21 with a relatively lower rigidity absorb side collision energy when receiving a side collision load and protect the battery device 5.

As illustrated in FIGS. 2 and 9, a seat mount bracket 22 that forms a fixing part 22a for the front part of the front seat is joined and fixed to the upper part of the side member 21 in the front cross member 18 described above. This seat mount bracket 22 is formed separately from the side member 21 that forms the front cross member 18 to keep the front cross member 18 linear.

As illustrated in FIG. 2, on the upper surface of the front floor panel 4 in a position separated backward from the front cross member 18 described above, there is provided a middle part cross member (so-called No. 2.5 cross member) 23 as a second floor cross member extending linearly in the vehicle width direction between the pair of left and right side sills 10. This middle part cross member 23 is provided in parallel with the front cross member 18 described above.

As illustrated in FIG. 13, the middle part cross member 23 is joined and fixed to the front floor panel 4 so as to extend linearly above the front floor panel 4 in the vehicle width direction between the left and right the side sills 10 below the rear part of the front seat. As illustrated in FIG. 3, the middle part cross member 23 has a hat-shaped cross-section and a closed cross-section part 24 extending linearly in the vehicle width direction is formed between the middle part cross member 23 and the front floor panel 4. As illustrated in FIG. 13, the middle part cross member 23 described above includes a middle member 25 in the position corresponding to the entire width in the vehicle width direction of the battery device 5 and a side member 26 located on the outer side in the vehicle width direction of the battery device 5.

The middle member 25 described above may be made from an ultra-high-tensile steel plate with a thickness of 1.8 mm, the side members 26 may be made from a high-tensile steel plate (so-called high-tensile material) with a thickness of 1.0 mm, and the middle member 25 may be formed to have a rigidity higher than the side members 26. In addition, the middle member 25 described above is formed by a one member (single component). In addition, the side member 26 also functions as the seat mount bracket and a fixing part 26a for the rear part of the front seat is formed integrally with the top surface part thereof.

As illustrated in FIG. 3, the front floor panel 4 is provided with an erection bracket 27 that erects upward from the front floor panel 4 in the middle in the vehicle longitudinal direction between the front cross member 18 (No. 2 cross member) and the middle part cross member 23 (No. 2.5 cross member), that is, behind the middle part in the vehicle width direction of the front cross member 18. As illustrated in FIGS. 6, 11, and 12, the erection bracket 27 described above is formed to have an M-shaped cross-section in vehicle front view.

As illustrated in the enlarged cross-sectional view in FIG. 12, the erection bracket 27 described above is formed by integrating two upper walls 27a and 27b separated from each other in the vehicle width direction, outer side leg parts 27c and 27d and inner side leg parts 27e and 27f that extend downward from the end parts in the vehicle width direction of the upper walls 27a and 27b, a middle bottom wall 27g that couples the lower ends of the inner side leg parts 27e and 27f to each other in the vehicle width direction, and flange parts 27h and 27i that extend outward in the vehicle width direction from the lower ends of the outer side leg parts 27c and 27d. In this erection bracket 27, both sides and the middle part (specifically, the flange parts 27h and 27i and the middle bottom wall 27g) indicated by x in FIG. 6 are joined and fixed to the front floor panel 4 by spot welding means or the like.

In addition, as illustrated in FIG. 6, a plurality of beads 28 that are raised outward and extend in the vertical direction is formed at intervals in the vehicle longitudinal direction integrally with the outer side leg parts 27c and 27d and the inner side leg parts 27e and 27f described above, and the flange parts 27h and 27i and the middle bottom wall 27g are joined and fixed to the front floor panel 4 between the beads 28 and between the beads 28 and the front and rear end surfaces of the erection bracket 27 (see x in FIG. 6).

As illustrated in FIGS. 3 and 5, the tunnel part 9 provided in the middle in the vehicle width direction of the front part of the front floor panel 4 has a reinforcing bracket 30 with a portal cross-section as a body component. As illustrated in FIG. 5, this reinforcing bracket 30 is formed by integrating an upper wall 30a and side walls 30b and 30c extending downward from both sides in the vehicle width direction of the upper wall 30a, and the upper wall 30a and the left and right side walls 30b and 30c of the reinforcing bracket 30 are welded and jointed to the tunnel part 9 (see x in FIG. 5).

A concave part 30*d* extending in the vehicle longitudinal direction is recessed from the front part to the rear end part thereof in the upper wall 30*a* of the reinforcing bracket 30 described above, and ridges 30*e*, 30*f*, 30*g*, and 30*h* extending in the vehicle longitudinal direction are formed on the upper wall 30*a* of the reinforcing bracket 30 by forming this concave part 30*d*, and the cross-sectional rigidity of the upper wall 30*a* is improved accordingly.

As illustrated in FIGS. 3 and 5, the lower surface of the rear part of the reinforcing bracket 30 described above is provided with a rear reinforcing member 31 as a reinforcing member. As illustrated in FIG. 3, the upper wall 30*a* of the reinforcing bracket 30 is coupled to the upper wall of the tunnel part 9 via a coupling bracket 32 with a substantially Z-shape in side view immediately in front of the rear reinforcing member 31.

The coupling bracket 32 suppresses displacement (so-called cross-sectional collapse) between the reinforcing bracket 30 and the tunnel part 9 when a load is input in front collision of a vehicle and supports the reinforcing bracket 30 from below for reinforcement when a load is input to the reinforcing bracket 30 via a shift lever support bracket 73 due to an operation of a shift lever 72 described later.

On the other hand, as illustrated in FIGS. 2, 3, 7 and 14, a kick-up part reinforcing member 34 that reinforces a kick-up part 33 is provided in the middle in the vehicle width direction of the rear part of the front floor panel 4. As illustrated in FIG. 7, this kick-up part reinforcing member 34 is formed by integrating an upper wall 34*a*, left and right side walls 34*b* extending downward from both sides in the vehicle width direction of the upper wall 34*a*, a front wall 34*c* extending downward from the front end part of the upper wall 34*a*, and a flange part 34*d* formed integrally so as to extend outward from the lower ends of the side walls 34*b* and the front wall 34*c*.

As illustrated in FIG. 3, an opening 34*e* is provided in the upper wall 34*a* of the kick-up part reinforcing member 34 described above and a cover member 35 that detachably covers the opening 34*e* is provided on the upper wall 34*a*. As illustrated in FIG. 3, the kick-up part 33 described above extends upward and then extends backward from the upper end thereof, a rear cross member 36 (so-called No. 3 cross member) extending in the vehicle width direction is joined and fixed to the lower part of the kick-up part 33, and a closed cross-section part 37 extending in the vehicle width direction is formed between the rear cross member 36 and the kick-up part 33. As illustrated in FIG. 3, the rear floor pan 38 extending backward is continuously provided above the kick-up part 33 described above.

In FIG. 2, reference numeral 39 represents rear side frames that have a closed cross-sectional structure and extend in the vehicle longitudinal direction on both sides in the vehicle width direction of the rear floor pan 38 and the side sills 10 described above extend backward so that the rear end parts thereof overlap with the front end parts of the rear side frames 39 as illustrated in FIG. 2.

As illustrated in FIGS. 2 and 3, there is provided a console support bracket 40 as a vehicle component that extends in the vehicle longitudinal direction from the rear part of the reinforcing bracket 30 that is a body component above the tunnel part 9 to the front part of the kick-up part reinforcing member 34. This console support bracket 40 is disposed above the middle in the vehicle width direction of the front cross member 18, the erection bracket 27, and the middle in the vehicle width direction of the middle part cross member 23 and supports a console 70.

That is, the console support bracket 40 described above supports the console 70 disposed in the middle in the vehicle width direction of the front floor panel 4 and is mounted to the front cross member 18 that is the floor cross member.

As illustrated in FIG. 3, the console 70 described above is provided with the shift lever support bracket 73 having an upper part that supports the shift lever 72 on which a shift knob 71 is provided and a lower part fixed to the console support bracket 40 in the front and rear portions.

As illustrated in FIG. 3, the shift lever support bracket 73 described above is configured by integrating an upper bracket 74 that supports the shift lever 72, a middle bracket 75, and a base bracket 76. In addition, in the console 70 described above, substantially the entire part excluding the shift knob 71 is covered with an exterior member 77, the portion including the base bracket 76 substantially in front of the base bracket 76 is set to a console front part 70F, and the portion behind the base bracket 76 is set to a console rear part 70R.

As illustrated in FIG. 3, a cup holder 78 is formed in the upper part of the console rear part 70R immediately behind the base bracket 76, and a storage part 79 formed behind this cup holder 78 is covered with an armrest 80 in an openable and closable manner.

As illustrated in FIG. 9, an upward enlarged cross-sectional part 41 having a cross-section enlarged upward until the height of the console support bracket 40 is formed above the middle part in the vehicle width direction of the front cross member 18, specifically above the middle part in the vehicle width direction of the middle member 20. In this example, the upward enlarged cross-sectional part 41 is formed by a cross member reinforcing member 42 provided separately from the front cross member 18. This makes ridges X1 and X2 (see FIG. 14) that are base portions of the front cross member 18 linear along the vehicle width direction.

As illustrated in FIGS. 9 and 14, the cross member reinforcing member 42 includes an upper wall 42*a*, a front wall 42*b*, a rear wall 42*c*, left and right side walls 42*d* and 42*e*, and flange parts 42*f* and 42*g* extending outward in the vehicle width direction from the side walls 42*d* and 42*e*, and the front wall 42*b* and the rear wall 42*c* are joined and fixed to the front and rear walls of the front cross member 18 as illustrated in FIG. 14 and the flange parts 42*f* and 42*g* are joined and fixed to the upper wall of the front cross member 18 as illustrated in FIG. 9.

As illustrated in FIG. 10, the console support bracket 40 described above includes an upper wall 40*a*, left and right side walls 40*b* and 40*c*, and flange parts 40*d* and 40*e* extending outward in the vehicle width direction from the lower ends of the side walls 40*b* and 40*c*, and the side walls 40*b* and 40*c* of the console support bracket 40 are fixed to the upper wall 42*a* of the cross member reinforcing member 42 that forms the upward enlarged cross-sectional part 41 via the flange parts 40*d* and 40*e*.

In addition, as illustrated in FIG. 4, a concave part 40*f* recessed downward is formed integrally in the middle part in the vehicle width direction of the upper wall 40*a* of the console support bracket 40 described above. This concave part 40*f* extends in the vehicle longitudinal direction from the front end of the console support bracket 40 to the vicinity of the rear end part, and a plurality of ridges 40*g*, 40*h*, 40*i*, 40*j*, and 40*k* extending in the vehicle longitudinal direction is formed on the upper wall 40*a* of the console support bracket 40 by forming this concave part 40*f*.

As illustrated in FIGS. 9 and 10, in this example, the left and right flange parts 40*d* and 40*e* of the console support bracket 40 are jointly fastened and fixed to the upper wall 42a of the cross member reinforcing member 42 together with a reinforcing support bracket 51 described later via fastening members 43 such as bolts and nuts.

That is, as illustrated in FIG. 9, the upward enlarged cross-sectional part 41 having a cross-section enlarged upward is provided in the middle in the vehicle width direction of the front cross member 18 and the console support bracket 40 described above is fastened to the upward enlarged cross-sectional part 41.

As illustrated in FIG. 9, the fixing parts (that is, seat fixing parts 44) for the front part of the front seat are formed at the same height as the upward enlarged cross-sectional part 41 on both sides in the vehicle width direction of the upper wall 42a of the cross member reinforcing member 42 that forms the upward enlarged cross-sectional part 41. This makes ridges X3 and X4 (that is, ridges X3 and X4 at the upper front and upper rear of the cross member reinforcing member 42) of the upward enlarged cross-sectional part 41 linear along vehicle width direction.

In addition, the front parts of seat slide rails 46 are mounted to the seat fixing parts 44 and the fixing parts 22a for the front part of the front seat of the seat mount brackets 22 via mount members 45, and a front seat 47 (driver's seat on the right side of the vehicle) as the front seat is disposed above the seat slide rails 46. It should be noted here that a seat cushion 47C of the front seat 47 is illustrated in FIG. 9. In addition, on the left side of the vehicle, a passenger's seat as the front seat is disposed above the seat slide rails 46 described above.

As illustrated in FIGS. 4 and 10, there is provided a front reinforcing member 48 as a reinforcing member that reinforces the front part of the console support bracket 40 from the lower surface thereof. As illustrated in FIG. 15, the tunnel part 9 described above is formed in the front floor panel 4 in front of the shift lever support bracket 73, the front part of the console support bracket 40 is connected to the tunnel part 9 via the reinforcing bracket 30, and the front reinforcing member 48 is provided as a reinforcing member that reinforces the portion of the console support bracket 40 in front of a front side fixing part α described later.

As illustrated in FIG. 10, this front reinforcing member 48 is formed to have a portal cross-section that reinforces the upper wall 40a and the left and right side walls 40b and 40c of the console support bracket 40. As illustrated in FIGS. 9 and 10, the front part of the base bracket 76 of the shift lever support bracket 73 is mounted to the console support bracket 40 above the front cross member 18 via mount rubbers 49 and mount members 50 including bolts and nuts, and the reinforcing support bracket 51 for supporting the upper surface (that is, the upper wall 40a) of the console support bracket 40 from below is fixed to the upper surface of the cross member reinforcing member 42 so as to erect.

As illustrated in FIG. 10, flange parts 76a and 76b are formed integrally with the left and right parts of the lower part of the base bracket 76 of the shift lever support bracket 73 described above and left and right portions of the shift lever support bracket 73 are mounted to the console support bracket 40 described above by tightening these flange parts 76a and 76b via the mount members 50 on the upper surfaces of the mount rubbers 49.

As illustrated in FIGS. 9 and 10, the reinforcing support bracket 51 described above is formed to have an M-shaped cross-section in vehicle front view and, as illustrated in FIG. 10, the left and right flange parts 51a and 51b of the reinforcing support bracket 51 are mounted to the upper wall 42a of the cross member reinforcing member 42 together with the flange parts 40d and 40e of the console support bracket 40 via the fastening members 43.

In addition, the reinforcing support bracket 51 described above with the M-shaped cross-section has two upper walls 51c and 51d and these upper walls 51c and 51d, the front reinforcing member 48, and the console support bracket 40 are superposed on each other to be jointly fastened and fixed to each other.

That is, the reinforcing support bracket 51 erecting upward is provided in the middle in the vehicle width direction of the upward enlarged cross-sectional part 41 of the front cross member 18, both the side walls 40b and 40c of the console support bracket 40 are fastened to the upward enlarged cross-sectional part 41 (the cross member reinforcing member 42) using the fastening members 43 via the flange parts 40d and 40e, and the upper wall 40a is fastened to the upper walls 51c and 51d of the reinforcing support bracket 51 using the mount members 50.

As illustrated in FIG. 13, which is a cross-sectional view seen along arrows D-D in FIG. 2, a cross member reinforcing member 52 is joined and fixed above the middle in the vehicle width direction of the middle part cross member 23 as the second floor cross member. As illustrated in FIG. 14, this cross member reinforcing member 52 has a hat-shaped cross-section and an upward enlarged cross-sectional part 53 is formed above the closed cross-section part 24 in this cross member reinforcing member 52.

As illustrated in FIG. 14, the middle part cross member 23 cannot be higher than the front cross member 18 vertically. That is, since the legs of the occupant on the rear seat are located on the middle part cross member 23 and the height of the middle part cross member 23 cannot be larger, the yield strength against side collision is low. Accordingly, the upward enlarged cross-sectional part 53 is formed by the cross member reinforcing member 52 to compensate this, thereby improving the yield strength against side collision.

In addition, as illustrated in FIG. 13, the foot space for the occupant on the rear seat is obtained by extending the middle part cross member 23 substantially linearly along the vehicle width direction with the upper surface thereof lower than the upper surface of the side sill inner 11.

As illustrated in FIG. 14, since the cross member reinforcing member 52 described above covers the middle part cross member 23 entirely from the lower part to the upper part and is welded and jointed to the front floor panel 4 together with the middle part cross member 23, the rigidity of the middle member 25 is further improved and the side collision performance of the middle member 25 is improved. In addition, when receiving a side collision load, the side members 26 absorb energy and protect the battery device 5.

As illustrated in FIG. 14, the middle part cross member 23 that is the second floor cross member is lower than the console support bracket 40 behind the erection bracket 27, the console support bracket 40 has a portal cross-section in vehicle front view as illustrated in FIG. 13, and the side walls 40b and 40c thereof are mounted to the middle part cross member 23 via the cross member reinforcing member 52.

Specifically, as illustrated in FIG. 13, the left and right side walls 40b and 40c of the console support bracket 40 are mounted to the upper wall of the cross member reinforcing member 52 via the flange parts 40d and 40e. The flange parts 40d and 40e described above are fastened and fixed to the cross member reinforcing member 52 via fastening members 54 such as bolts and nuts.

As illustrated in FIG. 13, the fixing parts (that is, seat fixing parts 55) for the rear part of the front seat are formed on both sides in the vehicle width direction of the cross member reinforcing member 52 that forms the upward enlarged cross-sectional part 53. The rear parts of the seat slide rails 46 described above are mounted to the seat fixing parts 55 and the fixing parts 26a of the front seat rear parts of the side members 26 via mount members 56.

The shift lever support bracket 73 described above supports the shift lever 72 as illustrated in FIGS. 3 and 14, and this shift lever support bracket 73 is fixed across the cross member reinforcing member 42 above the front cross member 18 and the front part of the erection bracket 27 as illustrated in FIG. 14.

As described in detail with reference to FIGS. 9 and 10, the left and right parts of the front side fixing parts of the shift lever support bracket 73 are fixed to the cross member reinforcing member 42 via the mount rubbers 49 and the mount members 50. In addition, as illustrated in FIGS. 11 and 12, in the rear side fixing parts of the shift lever support bracket 73, the left and right flange parts 76a and 76b of the base bracket 76 are mounted to the upper walls 27a and 27b of the erection bracket 27 via the console support bracket 40 via mount rubbers 57 and mount members 58 such as bolts and nuts.

As illustrated in FIG. 14, the erection bracket 27 is formed so as to further extend backward from the rear side fixing parts (see the positions of the mount rubbers 57 and the mount members 58) of the shift lever support bracket 73 and the upper wall 40a of the console support bracket 40 described above is fixed to the erection bracket 27 via mount members such as bolts and nuts (not illustrated) behind the fixing parts of the shift lever support bracket 73. As illustrated in FIGS. 11 and 12, the width in the vehicle width direction of the upper part of the erection bracket 27 is smaller than the width in the vehicle width direction of the console support bracket 40.

As illustrated in FIGS. 8, 5, and 14, the console support bracket 40 (vehicle component) is connected to the tunnel part 9 via the reinforcing bracket 30 (body component), and the console support bracket 40, the reinforcing bracket 30, the front reinforcing member 48, and the rear reinforcing member 31 are superposed on each other via the upper walls 40a and 30a and the side walls 40b, 40c, 30b, and 30c and fastened by fastening members.

That is, as illustrated in FIG. 8, on the upper side, the upper wall 40a of the console support bracket 40, the front reinforcing member 48, the upper wall 30a of the reinforcing bracket 30, and the rear reinforcing member 31 are tightened to each other via fastening members 59 such as bolts and nuts. On the side, the side walls 40b and 40c of the console support bracket 40, the front reinforcing member 48, the side walls 30b and 30c of the reinforcing bracket 30, and the rear reinforcing member 31 are fastened to each other via fastening members 60 such as bolts and nuts. As illustrated in FIGS. 1, 3, and 8, a bottom part console 81 is provided between the front end of the lower part of the console front part 70F and the lower part of the instrument panel 2.

As illustrated in FIG. 8, this bottom part console 81 is formed by integrating a bottom wall 81a located in the middle in the vehicle width direction, an inner wall 81b raised upward from both the left and right end parts in the vehicle width direction of the bottom wall 81a, and an outer wall 81c extending downward from the upper end of the inner wall 81b, and the bottom part console 81 covers the front part of the console support bracket 40 and the reinforcing bracket 30 from above.

In addition, as illustrated in FIGS. 3, 4, and 14, a mount bracket 61 having a portal cross-section is provided above the rear part of the console support bracket 40. A bracket 82 close to the console rear part 70R is mounted to the mount bracket 61 using mount rubbers 62 and mount members 63 such as bolts and nuts.

As illustrated in FIG. 3, the shift lever 72 described above has, in the lower end part thereof, a pivot part P as a mount point at which the shift lever support bracket 73 is mounted to the upper bracket 74, this pivot part P is offset forward with respect to the front side fixing part α and a rear side fixing part β (particularly, the front side fixing part α) that are the fixing parts in which the shift lever support bracket 73 is fixed to the console support bracket 40, so that a storage space 90 can be obtained below (specifically, in lower front of) the shift lever 72.

In this example, as illustrated in FIGS. 1, 3, and 8, the storage space 90 described above is formed above the bottom wall 81a of the bottom part console 81 below the shift lever 72. From any of the driver's seat and the front passenger seat, an article such as a baggage (not illustrated) can be input to or output from the storage space 90 through the upper end part between the inner wall 81b and the outer wall 81c.

As illustrated in FIGS. 10, 14, and 15, the front side fixing part α described above is the fixing part to which the shift lever support bracket 73 and the console support bracket 40 are mounted via the mount members 50 and, as illustrated in FIGS. 12, 14, and 15, the rear side fixing part β described above is the fixing part to which the shift lever support bracket 73 and the console support bracket 40 are mounted via the mount members 58. In addition, the front side fixing part α of the console support bracket 40 illustrated in FIG. 10 has a rigidity higher than the rear side fixing part β of the console support bracket 40 illustrated in FIG. 12.

Specifically, the console support bracket 40 described above is formed to have a portal cross-section including the upper wall 40a and both the side walls 40b and 40c in vehicle front view as described above, in the region of the front side fixing parts α, the upper wall 40a and both the side walls 40b and 40c described above are fastened to the front cross member 18 as the lower body via the reinforcing support bracket 51 and the cross member reinforcing member 42 as illustrated in FIG. 10. In the region of the rear side fixing part β, only the upper wall 40a is fastened to the erection bracket 27 as the lower body as illustrated in FIG. 12. Accordingly, the rigidity of the front side fixing part α of the console support bracket 40 is higher than the rigidity of the rear side fixing part β.

That is, in this example, the portion of the body to which the front side fixing parts α of the console support bracket 40 are fastened is set to the front cross member 18 and the portion of the body to which the rear side fixing parts β are fastened is set to the erection bracket 27, so that the region of the front side fixing parts α is fixed to the front cross member 18 as illustrated in FIG. 10 and the region of the rear side fixing parts β is fixed to the erection bracket 27 as illustrated in FIG. 12 in the console support bracket 40. It should be noted here that an arrow F represents the vehicle front and an arrow R represents the vehicle rear.

As described above, the lower body structure of a vehicle according to the example described above includes the floor panel (see the front floor panel 4) that forms a floor surface of a vehicle interior; the floor cross member (the front cross member 18) provided so as to extend in the vehicle width direction above the floor panel (the front floor panel 4); the console support bracket 40 that supports the console 70 provided at the center of the floor panel (see the middle in the vehicle width direction of the front floor panel 4) and is mounted to the floor cross member (the front cross member 18); and the shift lever support bracket 73 having the upper part that supports the shift lever 72 and the lower part that is fixed to the console support bracket 40 in front and rear portions thereof, in which the mount point (the pivot part P) at which the shift lever 72 is mounted to the shift lever support bracket 73 is offset forward with respect to the fixing parts (see the front side fixing parts α and the rear side fixing parts β) in which the shift lever support bracket 73 is fixed to the console support bracket 40, and the front side fixing parts α of the console support bracket 40 have a rigidity higher than the rear side fixing parts β of the console support bracket 40 (see FIGS. 3, 9 to 12, 14, and 15).

Since the shift lever 72 is supported by the upper part of the shift lever support bracket 73 and the lower part thereof is fixed to the console support bracket 40 in the front and rear portions and the rigidity of the front side fixing part α of the console support bracket 40 is high in this structure, reduction in the support rigidity of the shift lever 72 can be suppressed.

In addition, since the mount point (the pivot part P) at which the shift lever 72 is mounted to the shift lever support bracket 73 is offset forward with respect to the fixing parts (the front side fixing parts α and the rear side fixing parts β) in which the shift lever support bracket 73 is fixed to the console support bracket 40, the storage space 90 (see FIGS. 1, 3, and 8) can be obtained below the shift lever 72. That is, the storage space 90 can be obtained below the shift lever 72 while suppressing reduction in the support rigidity of the shift lever 72.

In addition, according to an embodiment of the present disclosure, the console support bracket 40 is formed to have a portal cross-section having the upper wall 40a and both the side walls 40b and 40c in vehicle front view, the upper wall 40a and both the side walls 40b and 40c in the region of the front side fixing parts α are fastened to a lower body (the front cross member 18), and only the upper wall 40a in the region of the rear side fixing parts β is fastened to the lower body (erection bracket 27) (see FIGS. 9 to 12).

In this structure, in the region of the front side fixing parts α that receives an operation load of the shift lever 72, the support rigidity of the shift lever 72 is obtained by fastening the upper wall 40a and both the side walls 40b and 40c to the lower body (the front cross member 18). In the region of the rear side fixing parts β, the console support bracket 40 can be simplified, the number of components required for fastening can be reduced, and the number of man-hours can be reduced by fastening only the upper wall 40a to the lower body (the erection bracket 27).

In addition, according to an embodiment of the present disclosure, in the console support bracket 40, the region of the front side fixing parts α is fixed to the floor cross member (the front cross member 18) and the region of the rear side fixing parts β is fixed to the erection bracket 27 that erects upward from the floor panel (the front floor panel 4) (see FIGS. 9 to 12 and 15).

In this structure, since the regions of the front side and rear side fixing parts α and β of the console support bracket 40 are fixed to the floor cross member (the front cross member 18) and the erection bracket 27, both the left and right side walls 40b and 40c of the console support bracket 40 do not need to extend downward to the floor panel (the front floor panel 4) and the height of both the side walls 40b and 40c of the console support bracket 40 can be reduced, thereby achieving weight reduction.

In addition, according to an embodiment of the present disclosure, the lower body structure of a vehicle further includes the upward enlarged cross-sectional part 41 having a cross-section enlarged upward at the center (specifically, the middle in the vehicle width direction) of the floor cross member (the front cross member 18), in which the console support bracket 40 is fastened to the upward enlarged cross-sectional part 41 (see FIG. 9).

In this structure, by tightening the console support bracket 40 to the upward enlarged cross-sectional part 41 while improving side collision performance via the upward enlarged cross-sectional part 41 described above, the lower end of the console support bracket 40 does not need to extend downward to the floor panel (the front floor panel 4), and the weight of the console support bracket 40 can be reduced and the support rigidity thereof can be improved.

In addition, according to an embodiment of the present disclosure, the lower body structure of a vehicle further includes the reinforcing support bracket 51 erecting upward provided at the center (specifically, the middle in the vehicle width direction) of the upward enlarged cross-sectional part 41 of the floor cross member (the front cross member 18), in which both the side walls 40b and 40c of the console support bracket 40 are fastened to the upward enlarged cross-sectional part 41, and the upper wall 40a is fastened to the reinforcing support bracket 51 (see FIGS. 9 and 10). In this structure, the rigidity of the front side fixing parts α to which the shift lever support bracket 73 is fixed can be improved by the reinforcing support bracket 51.

In addition, according to an embodiment of the present disclosure, the tunnel part 9 is formed in the portion of the floor panel (the front floor panel 4), the portion being located in front of the shift lever support bracket 73, the front part of the console support bracket 40 is connected to the tunnel part 9, and the reinforcing member (the front reinforcing member 48) that reinforces the portion of the console support bracket 40 is provided, the portion being located in front of the front side fixing parts α (see FIGS. 4 and 15).

This structure has the following effects. That is, the front side fixing parts α of the console support bracket 40 and the portion in front of the front side fixing parts α receive a significant load by an operation of the shift lever 72 and the reinforcing member (the front reinforcing member 48) reinforces the bridge between the floor cross member (the front cross member 18) and the tunnel part 9, so the rigidity between the floor cross member (the front cross member 18) and the tunnel part 9 can be improved.

In addition, according to an embodiment of the present disclosure, the reinforcing member (the front reinforcing member 48) is formed to have a portal cross-section that reinforces the upper wall 40a and both the side wall 40b and 40c of the console support bracket 40 (see FIG. 8). In this structure, the yield strength of the reinforcing member (the front reinforcing member 48) against a load from above can be improved.

In addition, according to an embodiment of the present disclosure, the console support bracket 40 is connected to the tunnel part 9 via the reinforcing bracket 30 having both the side walls 30b and 30c and the upper wall 30a connected to the tunnel part 9, the reinforcing bracket 30 has the second reinforcing member (the rear reinforcing member 31), and the console support bracket 40, the reinforcing bracket 30, the reinforcing member (the front reinforcing member 48), and the second reinforcing member (the rear reinforcing member 31) are superposed on each other via the upper walls 40a and 30a and both the side walls 40b and 40c and both the side walls 30b and 30c and fastened by the fasteners (59 and 60) (see FIGS. 5 and 8).

In this structure, the rigidity of the front joint part (that is, the joint part between the front part of the console support bracket 40 and the rear part of the reinforcing bracket 30) that is likely to become a weak point due to application of a significant load by the operation of the shift lever 72 can be improved by the superposed fastening structure (so-called joint fastening structure) of the four components 40, 48, 30, and 31 described above.

The correspondence between components in the present disclosure and components in the example described above will be described. The floor panel in the present disclosure corresponds to the front floor panel 4 in the example. Similarly, the floor cross member corresponds to the front cross member 18 (so-called No. 2 cross member), the mount point at which the shift lever is mounted to the shift lever support bracket corresponds to the pivot part P, the fixing parts in which the shift lever support bracket is fixed to the console support bracket correspond to the front side fixing part α and the rear side fixing part β, the lower body to which the front side fixing part is to be tightened corresponds to the front cross member 18, the lower body to which the rear side fixing part is to be tightened corresponds to the erection bracket 27, the reinforcing member that reinforces the portion of the console support bracket in front of the front side fixing part corresponds to the front reinforcing member 48, the second reinforcing member corresponds to the rear reinforcing member 31, and the fasteners correspond to the fastening members 59 and 60, but the present disclosure is not limited to only the structure in the example described above.

In addition, since the shift lever support bracket 73 is fixed across the middle part of the floor cross member (front cross member 18) and the erection bracket 27, the support rigidity of the shift lever support bracket 73 can be improved. Also, although the floor panel (front floor panel 4) is substantially flat and this is disadvantageous in terms of vibrations of the floor panel (front floor panel 4), vibrations of the floor panel (front floor panel 4) can be suppressed by the erection bracket 27. That is, it is possible to ensure the support rigidity of the shift lever support bracket 73 and suppress vibrations of the floor panel (front floor panel 4) while improving side collision performance According to an embodiment of the present disclosure, the erection bracket 27 further extends backward from the mount part (see the position of the mount member 58) of the shift lever support bracket 73, and the upper surface part (upper wall 40a) of the console support bracket 40 is fixed to the erection bracket 27 behind the mount part (see the position of the mount member 58) of the shift lever support bracket 73 (see FIGS. 11 and 14). In this structure, the rear portion of the shift lever support bracket 73 can be supported by the upper surface of the console support bracket 40 and the erection bracket 27 further extends backward from the mount part (see the position of the mount member 58) of the shift lever support bracket 73, so the fixing range in which the erection bracket 27 is fixed to the floor panel (front floor panel 4) is enlarged, thereby enabling further suppression of vibrations of the floor panel (front floor panel 4).

In addition, according to an embodiment of the present disclosure, the left and right portions of the shift lever support bracket 73 are mounted to the erection bracket 27, and the erection bracket 27 is formed to have an M-shaped cross-section in vehicle front view and both sides (see the leg parts 27c and 27d) and a middle part (see the middle bottom wall 27g) of the erection bracket are joined and fixed to the floor panel (see the front floor panel 4) (see FIGS. 11 and 12). In this structure, by forming the erection bracket 27 to have an M-shaped cross-section, it is possible to improve the rigidity of both left and right sides (leg parts 27c and 27d) of the erection bracket 27 and the middle part (middle bottom wall 27g) of the erection bracket 27 between the support parts (upper walls 27a and 27b) that support the shift lever support bracket 73.

In addition, according to an embodiment of the present disclosure, the leg parts 27c and 27d are formed on both the sides of the erection bracket 27, the plurality of beads 28 raised outward is formed in each of the leg parts 27c and 27d, the beads 28 being arranged in the vehicle longitudinal direction at intervals, the flange parts 27h and 27i extending outward from the lower ends of the leg parts 27c and 27d are formed at the lower ends, and the flange parts 27h and 27i are joined and fixed to the floor panel (front floor panel 4) via portions between the beads 28 (see FIGS. 6 and 12). In this structure, the rigidity in the vertical direction of the erection bracket 27 is improved by the plurality of beads 28 formed on the leg parts 27c and 27d, and weight reduction of the erection bracket 27 can be achieved by reduction in the area of the flange parts 27h and 27i.

In addition, according to an embodiment of the present disclosure, the erection bracket 27 has a dimension in the vehicle width direction smaller than the console support bracket 40, the second floor cross member (middle part cross member 23) having a height smaller than the console support bracket 40 is provided behind the erection bracket 27, and the console support bracket 40 is formed to have a portal cross-section in vehicle front view and a side wall part (see side walls 40b, 40c) of the console support bracket 40 is mounted to the second floor cross member (middle part cross member 23) (however, in this example, the side walls 40b and 40c of the console support bracket 40 are mounted to the middle part cross member 23 via the cross member reinforcing member 52)(see FIGS. 12, 13, and 14). In this structure, the dimension in the vehicle width direction of the erection bracket 27 is smaller than the dimension in the vehicle width direction of the console support bracket 40, thereby enabling weight reduction of the erection bracket 27 by reducing the dimension in the vehicle width direction of the erection bracket 27.

In addition, the side wall parts (side walls 40b and 40c) of the console support bracket 40 are mounted to the second floor cross member (middle part cross member 23) and the side wall parts (side walls 40b and 40c) of the console support bracket 40 do not need to extend downward to the floor panel (front floor panel 4), the console support bracket 40 can be supported by the vehicle body while achieving weight reduction of the side wall parts (side walls 40b and 40c) of the console support bracket 40.

The correspondence between components in the present disclosure and components in the example described above will be described. The floor panel in the present disclosure corresponds to the front floor panel 4 in the example. Similarly, the floor cross member corresponds to the front cross member 18 (so-called No. 2 cross member), both sides of the erection bracket correspond to the leg parts 27c and 27d, the middle part of the erection bracket corresponds to the middle bottom wall 27g, the second floor cross member corresponds to the middle part cross member 23 (so-called No. 2.5 cross member), and the upper surface part of the console support bracket corresponds to the upper wall 40a, the side wall parts of the console support bracket correspond to the side walls 40b and 40, but the present disclosure is not limited to only the structure in the example described above.

As described above, the present disclosure is useful for a lower body structure of a vehicle in which a shift lever is disposed in a console.

What is claimed is:

1. A lower body structure of a vehicle, comprising:
a floor panel that forms a floor surface of a vehicle interior;
a floor cross member that extends in a vehicle width direction above the floor panel;
a console support bracket that supports a console provided at a center of the floor panel and is mounted to the floor cross member; and
a shift lever support bracket having an upper part that supports a shift lever and a lower part that is fixed to the console support bracket in front and rear parts thereof, wherein
a mount point at which the shift lever is mounted to the shift lever support bracket is offset forward with respect to front side and rear side fixing parts in which the shift lever support bracket is fixed to the console support bracket, and
the front side fixing part of the console support bracket has a rigidity higher than the rear side fixing part.

2. The lower body structure of a vehicle according to claim 1, wherein
the console support bracket is formed to have a portal cross-section including an upper wall and both side walls in a vehicle front view,
the upper wall and both the side walls in a region of the front side fixing part are fastened to a lower body, and
only the upper wall in a region of the rear side fixing part is fastened to a lower body.

3. The lower body structure of a vehicle according to claim 2, wherein
the region of the front side fixing part of the console support bracket is fixed to the floor cross member, and
the region of the rear side fixing part is fixed to an erection bracket that erects upward from the floor panel.

4. The lower body structure of a vehicle according to claim 3, further comprising:
an upward enlarged cross-sectional part having a cross-section enlarged upward at a center of the floor cross member,
wherein the console support bracket is fastened to the upward enlarged cross-sectional part.

5. The lower body structure of a vehicle according to claim 4, further comprising:
a reinforcing support bracket provided at the center of the upward enlarged cross-sectional part of the floor cross member so as to erect upward,
wherein both the side walls of the console support bracket are fastened to the upward enlarged cross-sectional part, and the upper wall is fastened to the reinforcing support bracket.

6. The lower body structure of a vehicle according to claim 2, wherein
a tunnel part is formed in a portion of the floor panel, the portion being located in front of the shift lever support bracket,
a front part of the console support bracket is connected to the tunnel part, and
a reinforcing member that reinforces a portion of the console support bracket is provided, the portion being located in front of the front side fixing part.

7. The lower body structure of a vehicle according to claim 6, wherein
the reinforcing member is formed to have a portal cross-section that reinforces the upper wall and both the side walls of the console support bracket.

8. The lower body structure of a vehicle according to claim 7, wherein
the console support bracket is connected to the tunnel part via a reinforcing bracket having both side walls and an upper wall connected to the tunnel part,
the reinforcing bracket has a second reinforcing member, and
the console support bracket, the reinforcing bracket, the reinforcing member, and the second reinforcing member are superposed on each other via the upper walls and both the side walls and fastened by a fastener.

9. The lower body structure of an electric vehicle according to claim 3, wherein
the erection bracket further extends backward from a mount part of the shift lever support bracket, and
an upper surface part of a console support bracket is fixed to the erection bracket behind the mount part of the shift lever support bracket.

10. The lower body structure of an electric vehicle according to claim 9, wherein
left and right portions of the shift lever support bracket are mounted to the erection bracket, and
the erection bracket is formed to have an M-shaped cross-section in vehicle front view and both sides and a middle part of the erection bracket are joined and fixed to the floor panel.

11. The lower body structure of an electric vehicle according to claim 3, wherein
leg parts are formed on both the sides of the erection bracket,
a plurality of beads raised outward is formed in each of the leg parts, the beads being arranged in a vehicle longitudinal direction at intervals,
flange parts extending outward from lower ends of the leg parts are formed at the lower ends, and
the flange parts are joined and fixed to the floor panel via portions between the beads.

12. The lower body structure of an electric vehicle according to claim 9, wherein
the erection bracket has a dimension in the vehicle width direction smaller than the console support bracket,
a second floor cross member having a height smaller than the console support bracket is provided behind the erection bracket, and
the console support bracket is formed to have a portal cross-section in vehicle front view and a side wall part of the console support bracket is mounted to the second floor cross member.

13. The lower body structure of a vehicle according to claim 3, wherein
a tunnel part is formed in a portion of the floor panel, the portion being located in front of the shift lever support bracket,
a front part of the console support bracket is connected to the tunnel part, and
a reinforcing member that reinforces a portion of the console support bracket is provided, the portion being located in front of the front side fixing part.

14. The lower body structure of a vehicle according to claim 4, wherein
a tunnel part is formed in a portion of the floor panel, the portion being located in front of the shift lever support bracket,
a front part of the console support bracket is connected to the tunnel part, and a reinforcing member that reinforces a portion of the console support bracket is provided, the portion being located in front of the front side fixing part.

15. The lower body structure of a vehicle according to claim 5, wherein
a tunnel part is formed in a portion of the floor panel, the portion being located in front of the shift lever support bracket,
a front part of the console support bracket is connected to the tunnel part, and
a reinforcing member that reinforces a portion of the console support bracket is provided, the portion being located in front of the front side fixing part.

16. The lower body structure of a vehicle according to claim 13, wherein
the reinforcing member is formed to have a portal cross-section that reinforces the upper wall and both the side walls of the console support bracket.

17. The lower body structure of a vehicle according to claim 14, wherein
the reinforcing member is formed to have a portal cross-section that reinforces the upper wall and both the side walls of the console support bracket.

18. The lower body structure of a vehicle according to claim 15, wherein
the reinforcing member is formed to have a portal cross-section that reinforces the upper wall and both the side walls of the console support bracket.

19. The lower body structure of a vehicle according to claim 16, wherein
the console support bracket is connected to the tunnel part via a reinforcing bracket having both side walls and an upper wall connected to the tunnel part,
the reinforcing bracket has a second reinforcing member, and
the console support bracket, the reinforcing bracket, the reinforcing member, and the second reinforcing member are superposed on each other via the upper walls and both the side walls and fastened by a fastener.

20. The lower body structure of a vehicle according to claim 17, wherein
the console support bracket is connected to the tunnel part via a reinforcing bracket having both side walls and an upper wall connected to the tunnel part,
the reinforcing bracket has a second reinforcing member, and
the console support bracket, the reinforcing bracket, the reinforcing member, and the second reinforcing member are superposed on each other via the upper walls and both the side walls and fastened by a fastener.

* * * * *